(12) United States Patent
Shindo et al.

(10) Patent No.: US 9,612,594 B2
(45) Date of Patent: Apr. 4, 2017

(54) METHOD FOR DETERMINING A MACHINING MEANS IN HYBRID ULTRAPRECISION MACHINING DEVICE, AND HYBRID ULTRAPRECISION MACHINING DEVICE

(71) Applicant: PANASONIC CORPORATION, Osaka (JP)

(72) Inventors: Takashi Shindo, Osaka (JP); Yoshiyuki Uchinono, Osaka (JP); Kimitake Okugawa, Osaka (JP); Noboru Urata, Osaka (JP); Syoji Kuroki, Osaka (JP); Akira Fukuoka, Osaka (JP); Atsushi Sakaguchi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 525 days.

(21) Appl. No.: 14/343,428

(22) PCT Filed: Dec. 14, 2012

(86) PCT No.: PCT/JP2012/083174
§ 371 (c)(1),
(2) Date: Mar. 7, 2014

(87) PCT Pub. No.: WO2013/089282
PCT Pub. Date: Jun. 20, 2013

(65) Prior Publication Data
US 2014/0316552 A1    Oct. 23, 2014

(30) Foreign Application Priority Data
Dec. 14, 2011  (JP) .................. 2011-273089

(51) Int. Cl.
*B23K 26/0622* (2014.01)
*G05B 19/18* (2006.01)
(Continued)

(52) U.S. Cl.
CPC .......... *G05B 19/18* (2013.01); *B23K 26/0624* (2015.10); *B23K 26/0823* (2013.01);
(Continued)

(58) Field of Classification Search
None
See application file for complete search history.

(56) References Cited

U.S. PATENT DOCUMENTS

| 4,382,215 A * | 5/1983 | Barlow | G05B 19/4015 318/568.1 |
| 5,796,618 A * | 8/1998 | Maeda | G05B 19/4097 700/104 |

(Continued)

FOREIGN PATENT DOCUMENTS

| CN | 1772428 | 5/2006 |
| CN | 101082770 | 12/2007 |

(Continued)

OTHER PUBLICATIONS

International Search Report in PCT/JP2012/083174, mail date is Apr. 9, 2013, with an English language translation thereof.

(Continued)

*Primary Examiner* — Isaac T Tecklu
(74) *Attorney, Agent, or Firm* — Greenblum & Bernstein, P.L.C.

(57) ABSTRACT

There is provided a method for determining a machining means in a hybrid ultraprecision machining device for manufacturing a micro-machined product from a workpiece, the machining device comprising: an electromagnetic-wave-machining means for roughly machining the workpiece; a (Continued)

precision-machining means for precisely machining the roughly machined workpiece; and a shape-measurement means for measuring a shape of the workpiece upon use of the electromagnetic-wave machining means and the precision-machining means, wherein a choice is made between the electromagnetic-wave-machining means and the precision-machining means in the determination of the machining means, on the basis of: information on a stereoscopic model of the micro-machined product; information on a removal volume to be removed from a volume of the workpiece in the manufacturing of the micro-machined product; and data on a removal process time of the electromagnetic-wave-machining means and data on a removal process time of the precision-machining means.

14 Claims, 27 Drawing Sheets

(51) Int. Cl.
    *B23P 23/04*     (2006.01)
    *B23K 26/08*     (2014.01)
    *G05B 19/401*     (2006.01)
    *B23Q 39/02*     (2006.01)

(52) U.S. Cl.
    CPC ...... *B23K 26/0853* (2013.01); *B23K 26/0876* (2013.01); *B23P 23/04* (2013.01); *B23Q 39/024* (2013.01); *G05B 19/401* (2013.01); *G05B 2219/49376* (2013.01); *G05B 2219/50088* (2013.01)

(56) References Cited

U.S. PATENT DOCUMENTS

| | | | |
|---|---|---|---|
| 6,043,452 A | 3/2000 | Bestenlehrer | |
| 7,058,473 B2 | 6/2006 | Muraki et al. | |
| 7,862,761 B2 | 1/2011 | Okushima et al. | |
| 2002/0082742 A1* | 6/2002 | Kadono | G05B 19/4093 700/160 |
| 2003/0220710 A1* | 11/2003 | Sendai | G05B 17/02 700/162 |
| 2005/0222706 A1* | 10/2005 | Muraki | G05B 19/40938 700/187 |
| 2006/0065638 A1* | 3/2006 | Sasaki | B23H 7/20 219/69.13 |
| 2006/0079987 A1* | 4/2006 | Cha | G05B 19/4097 700/173 |
| 2006/0102608 A1* | 5/2006 | Katsuta | B23K 26/03 219/121.83 |
| 2007/0075063 A1* | 4/2007 | Wilbanks | B23K 26/03 219/121.85 |
| 2007/0278712 A1* | 12/2007 | Okushima | B82Y 10/00 264/236 |
| 2008/0177416 A1* | 7/2008 | Tanimoto | B23H 1/04 700/162 |
| 2009/0182449 A1* | 7/2009 | Frei | B23C 3/18 700/159 |
| 2009/0187269 A1* | 7/2009 | Miki | B23C 3/30 700/176 |
| 2010/0280650 A1* | 11/2010 | Takami | B24B 13/06 700/186 |
| 2011/0009993 A1* | 1/2011 | Chuang | G05B 19/4097 700/98 |
| 2014/0008340 A1* | 1/2014 | Urata | B23K 26/0093 219/121.76 |
| 2014/0316552 A1* | 10/2014 | Shindo | B23P 23/04 700/179 |
| 2014/0337402 A1* | 11/2014 | Tago | G06F 17/5018 708/424 |
| 2015/0025667 A1* | 1/2015 | Shindo | B23P 15/24 700/98 |

FOREIGN PATENT DOCUMENTS

| | | |
|---|---|---|
| EP | 0425674 | 5/1991 |
| EP | 2026152 | 2/2009 |
| JP | 2-109657 | 4/1990 |
| JP | 6-126474 | 5/1994 |
| JP | 6-210530 | 8/1994 |
| JP | 9-225947 | 9/1997 |
| JP | 2703616 | 1/1998 |
| JP | 10-508256 | 8/1998 |
| JP | 11-285924 | 10/1999 |
| JP | 2001-79854 | 3/2001 |
| JP | 2003-340652 | 12/2003 |
| JP | 2005-288563 | 10/2005 |
| JP | 2006-305709 | 11/2006 |
| JP | 2007-83285 | 4/2007 |
| JP | 2008-200761 | 9/2008 |
| JP | 2011-85976 | 4/2011 |

OTHER PUBLICATIONS

U.S. Appl. No. 14/343,417 to Takashi Shindo et al., filed Mar. 7, 2014.

English translation of International Preliminary Report on Patentability for PCT/JP2012/083174, and Notification of Transmittal thereof, mailed Jun. 26, 2014.

Office Action issued in China Patent Appl. No. 201280043552.X, dated Aug. 24, 2015, along with an English translation thereof.

* cited by examiner

Metal mold for optical lens $$Ra = \frac{1}{L} \int_0^L \left| f(x) \right| dx$$

Shaper machining

Fly-cut machining

Diamond-turning machining

Micro-milling machining

Vibration cutting (a)

Before cutting (b)

Starting of cutting (c)

During cutting (d)

Completion of cutting

Onboard measurement

Onboard measurement

Laser machining

Top plan view

Workpiece

Partial removal of workpiece

Shape of product
(Final shape)

Example of correlation data "A"

Volume to be removed by electromagnetic-wave machining

Example of correlation data "B"

Volume to be removed by precision machining

Additional time α (e.g., arrangement time required for switching from electromagnetic-wave machining to precision machining)

Volume to be removed by machining

Cross-sectional view (A-A')

Before Offset

Spot diameter

Portion larger than spot diameter
⇒ Electromagnetic-wave machinable

Portion smaller than spot diameter
⇒ Non-electromagnetic-wave machinable

Corner R

Electromagnetic-wave-machining means, precision-machining means and/or shape-measurement means Grinding

METHOD FOR DETERMINING A MACHINING MEANS IN HYBRID ULTRAPRECISION MACHINING DEVICE, AND HYBRID ULTRAPRECISION MACHINING DEVICE

TECHNICAL FIELD

The present invention relates to a method for determining a machining means in a hybrid ultraprecision machining device, and also a hybrid ultraprecision machining device. More particularly, the present invention relates to the hybrid ultraprecision machining device for obtaining a micro-machined product from a workpiece by hybrid ultraprecision machining, and also the method for determining the machining means in such device.

BACKGROUND OF THE INVENTION

In general industrial fields, machining processes have been traditionally performed to partially cut a material body (e.g., the body made of metal, wood or plastic) such that the body has a desired shape. For example, the cutting processes such as turning, milling and planning are performed to produce desired products or parts.

In a mass production of complicated products and parts, a metal mold for molding is generally manufactured by the machining process, for example. The metal mold is used for providing various types of molded products. Recently, electric devices and electronic devices have been decreasing their sizes and also have been improving their functions every year, which obviously requires miniaturization and high functionality of parts used in such devices. Therefore, the metal molds for molding such various parts or products having the requirements of the miniaturization and the high functionality are correspondingly required to be manufactured by the machining process with a sufficient accuracy of the miniaturization.

PATENT DOCUMENTS

Prior Art Patent Documents

PATENT DOCUMENT 1: Japanese Unexamined Patent Application Publication No. H09-225947
PATENT DOCUMENT 2: Japanese Unexamined Patent Application Publication No. 2001-79854

DISCLOSURE OF THE INVENTION

Problems to be Solved by the Invention

The conventional machinings, however, cannot be satisfactorily addressed for the metal molds requiring the miniaturization of recent years. For example in a case where the metal molds are manufactured by machining difficult-to-cut materials such as ultrahard material and hardened steel, there is some concern that a lifetime of a machining tool is shortened, thus resulting in an increase in a manufacturing cost and a machining time. This becomes pronounced as the metal molds are more miniaturized and finer. For this reason, a shape design of the molded products (i.e., the shape design of the metal mold or the final product) is forced to be changed from a practical point of view.

There can be an attempt that the type of the cutting tools is appropriately selected. However, the cutting tool has to be in contact with the workpiece during the cutting process, which still shortens the lifetime of the tool and also still takes much more time. There can be another attempt that a non-contact machining process (e.g., laser machining) is utilized. However, the laser machining is regarded as a heat generation process which is attributed to an absorption of laser beam in the workpiece, and thus the laser machining is not appropriate for a high accuracy machining. More particularly, the laser machining is generally regarded as being not used for fine products having the accurate requirements of surface roughness and shape.

During the machining process, a plurality of machining means may be sequentially used. In some cases (for example in case of some machining shape), the mere performing of a preliminarily-determined machining sequence may be not very effective. Depending on some machining shape or some machining area, it is possible to shorten a machining process time as a whole for example when a prior machining means of the preliminarily-determined sequence is not firstly used, but a subsequent machining means of the preliminarily-determined sequence is firstly used. In this regard, it would be difficult for an operator to determine which of the prior or subsequent machining means of the preliminarily-determined sequence is used. A preliminarily preparation for machining data would also be cumbersome task, and thus it will take longer time since such data can depend on various elements such as machining shape and machining area.

Under these circumstances, the present invention has been created. That is, the present invention is directed to provide a method for determining a machining means in a machining device, which is suitable for the manufacturing of a miniaturized product (particularly, a micro product with fine structure). The present invention is also directed to provide a hybrid ultraprecision machining device equipped with a system having machining data capable of determining the machining means.

Means for Solving the Problems

In light of the above, the present invention provides a method for determining a machining means in a hybrid ultraprecision machining device for manufacturing a micro-machined product from a workpiece,
the machining device comprising:
an electromagnetic-wave-machining means (i.e., electromagnetic-wave-machining device) for roughly machining the workpiece;
a precision-machining means (i.e., precision-machining device) for precisely machining the roughly machined workpiece; and
a shape-measurement means (i.e., shape-measurement device) for measuring a shape of the workpiece upon use of the electromagnetic-wave machining means and the precision-machining means,
wherein a choice is made between the electromagnetic-wave-machining means and the precision-machining means in the determination of the machining means, on the basis of:
information on a stereoscopic model of the micro-machined product;
information on a removal volume to be removed from a volume of the workpiece in the manufacturing of the micro-machined product; and
"data on a removal process time of the electromagnetic-wave-machining means" and "data on a removal process time of the precision-machining means".
In a preferred embodiment, a preprocessing for the determination of the machining means is performed by making use of three-dimensional CAD data on a final shape of the workpiece, in which an offset face is produced by displacing respective surfaces of the final shape by a designated amount, and a determination of whether or not the electromagnetic-wave-machining means should be used is made on the basis of whether or not the offset face is positioned inside of an outermost plane level of the workpiece.

It is preferred that, when the offset face is positioned at least partly inside of the outermost plane level of the workpiece, "tentative portion for electromagnetic-wave machining" is defined by a region enclosed by the outermost plane level and a part of the offset face, the part being positioned inside of the outermost plane level of the workpiece.

It is also preferred that, with respect to "tentative portion for electromagnetic-wave machining", a shape thereof is compared with a machinable shape stored in a database on the electromagnetic-wave-machining means to determine whether or not the electromagnetic-wave-machining means should be used.

Preferably, a volume of "tentative portion for electromagnetic-wave machining" is calculated to obtain a machining time "A" of the calculated volume based on correlation data "A" between the removal volume and the removal process time with respect to the electromagnetic-wave-machining means, and a machining time "B" of the calculated volume based on correlation data "B" between the removal volume and the removal process time with respect to the precision-machining means, and thereby the machining time "A" and the machining time "B" are compared with each other to determine whether or not the electromagnetic-wave-machining means should be used. It is preferred that an arrangement time required for a switching from the electromagnetic-wave-machining means to the precision-machining means is additionally taken into account in the comparison between the machining time "A" and the machining time "B".

It is preferred that the above definition and comparison are sequentially performed. Specifically, it is preferred that the followings are sequentially performed:

(a) the definition of the tentative portion for electromagnetic-wave machining;

(b) the comparison between the shape of the tentative portion for electromagnetic-wave machining and the machinable shape stored in the database; and (c) the comparison between the machining time "A" and the machining time "B".

With respect to the hybrid ultraprecision machining device to which the determining method of the machining means according to the present invention is directed, the electromagnetic-wave-machining means may be a laser-machining means. The precision-machining means may be equipped with a replaceable cutting tool selected from a group consisting of a planar tool, a shaper tool, a fly-cut tool, a diamond-turning tool and a micro-milling tool.

Moreover, the hybrid ultraprecision machining device further comprises a control means (i.e., controller) for controlling the electromagnetic-wave-machining means or the precision-machining means, based on information on the shape of the workpiece, the shape being measured by the shape-measuring means.

In a preferred embodiment, a micro part of the micro-machined product has a dimension of several tens of nm to several mm, that is, the dimension of about 10 nm to about 15 mm, or about 10 nm to about 3 mm. For example, the dimension of the micro part of the micro-machined product is in the range of 10 nm to 500 µm, 50 nm to 1 µm, or 1 nm to 1 µm in some cases. Examples of the micro-machined products with the micro part dimensions include a metal mold for an optical lens, and an optical lens.

The present invention also provides a hybrid ultraprecision machining device. This is a device for manufacturing a micro-machined product from a workpiece, the machining device comprising:

an electromagnetic-wave-machining means for roughly machining the workpiece;

a precision-machining means for precisely machining the roughly machined workpiece; and a shape-measurement means for measuring a shape of the workpiece upon use of the electromagnetic-wave machining means and the precision-machining means, the machining device further comprising a system provided with a memory in which machining data for the machining device is stored, the machining data is data for making a choice between the electromagnetic-wave-machining means and the precision-machining means on the basis of:

information on a stereoscopic model of the micro-machined product;

information on a removal volume to be removed from a volume of the workpiece in the manufacturing of the micro-machined product; and data on a removal process time of the electromagnetic-wave-machining means and data on a removal process time of the precision-machining means.

In a preferred embodiment, the machining data is capable of making a determination of whether or not the electromagnetic-wave-machining means should be used by making use of three-dimensional CAD data on a final shape of the workpiece, on the basis of whether or not an offset face is positioned inside of an outermost plane level of the workpiece, the offset face being produced by displacing respective surfaces of the final shape of the workpiece by a designated amount.

In another preferred embodiment, the machining data is capable of making the determination of whether or not the electromagnetic-wave-machining means should be used, when the offset face is positioned at least partly inside of the outermost plane level of the workpiece, by comparing a shape of a tentative portion for electromagnetic-wave machining with a machinable shape stored in a database regarding the electromagnetic-wave-machining means, the tentative portion for electromagnetic-wave machining being defined by a region enclosed by the outermost plane level of the workpiece and a part of the offset face, the part being positioned inside of the outermost plane level.

In still another preferred embodiment, the machining data is capable of making the determination of whether or not the electromagnetic-wave-machining means should be used by calculating a volume of the tentative portion for electromagnetic-wave machining, followed by obtaining a machining time "A" of the calculated volume based on correlation data "A" between the removal volume and the removal process time with respect to the electromagnetic-wave-machining means, and obtaining a machining time "B" of the calculated volume based on correlation data "B" between the removal volume and the removal process time with respect to the precision-machining means, followed by comparing the machining time "A" and the machining time "B" with each other.

Effect of Invention

With respect to an advantageous effect of the hybrid ultraprecision machining device for which the method for determining the machining means is used, there can be obtained a micro product with a fine structure in a short time with high accuracy even when such product can be manufactured from the difficult-to-cut materials such as ultrahard material and hardened steel.

Specifically, the hybrid ultraprecision machining device involves a rough machining of workpiece by non-contact electromagnetic wave machining as a primary process (in which most of parts to be machined are removed by such rough machining), and subsequent precision machining of the roughly machined workpiece as a secondary process by using a replaceable cutting tool. Accordingly, the lifetime of the tool is increased, and also the machining time is significantly reduced as a whole. The hybrid ultraprecision machining device can shorten the processing time by about 50% to about 80% as compared to the case of prior art wherein the micro product with the fine structure is manufactured from the difficult-to-cut material only by using a cutting tool. The hybrid ultraprecision machining device makes it possible to not only achieve the significant reduction of the machining time by the electromagnetic wave machining serving as the rough machining, but also achieve higher accuracies of the surface roughness and shape by the precision machining using the replaceable cutting tool together with an onboard measurement. As a result, the hybrid ultraprecision machining device can appropriately achieve the miniaturization and microfabrication of the metal mold without changing the shape design of the molded product (i.e., the shape of the final product, and thus the shape of the metal mold). This leads to an achievement of the miniaturization and microfabrication of the electric and electronic devices as well as various parts to be used therein. As such, a design of a desired fine product having a small size can be realized with no interruption of a manufacturing process itself, which enables the miniaturized electric and electronic devices with high performance to be suitably designed and developed.

With respect to the determining method of the machining means (i.e., in the hybrid ultraprecision machining device equipped with a system having a memory in which the machining data capable of determining the machining means is stored), it enables to make a suitable choice between the electromagnetic-wave-machining means and the precision-machining means, depending on the actual machining shape. This can lead to a reduction in the time of the machining process. In other words, while the electromagnetic-wave-machining means is used basically as a primary means, and the precision-machining means is used basically as a secondary means, the precision-machining means (which is basically used as the secondary means) can be directly used depending on the actual machining shape or area, which can effectively shorten the entire time of the machining process. This means that the present invention can shorten the total process time required for a desired shaping from the workpiece.

The present invention does not need an individual judgment for making a choice between the electromagnetic-wave-machining means and the precision-machining means, which can also lead to an achievement of an effective machining process. This means that the time required for the individual judgment and operation regarding the machining process as well as a creation of the machining data can be omitted or reduced.

BRIEF DESCRIPTION OF THE DRAWINGS

FIGS. 21A and 21B are conceptions showing "data on a removal process time of the electromagnetic-wave-machining means" and "data on a removal process time of the precision-machining means" wherein FIG. 21A is correlation data "A" between a removal volume and a removal process time with respect to the electromagnetic-wave-machining means, FIG. 21B is correlation data "B" between a removal volume and a removal process time with respect to the precision-machining means.

FIGS. 23A, 23B and 23C are views illustrating an embodiment of prior-to-offset and embodiments of an offset face wherein FIG. 23A shows a part of the offset face is positioned inside of the outermost plane level of the workpiece, FIG. 23B shows the offset face is as a whole positioned inside of the outermost plane level of the workpiece, and FIG. 23C shows the offset face is as a whole positioned outside of the outermost plane level of the workpiece.

FIGS. 26A and 26B are views schematically illustrating "spot diameter" and "corner R" wherein FIG. 26A shows spot diameter, and FIG. 26B shows corner R.

FIGS. 29A and 29B are the results regarding metal molds manufactured in "EXAMPLES" wherein FIG. 29A shows case "A", and FIG. 29B shows case "B".

MODES FOR CARRYING OUT THE INVENTION

Figure 1:
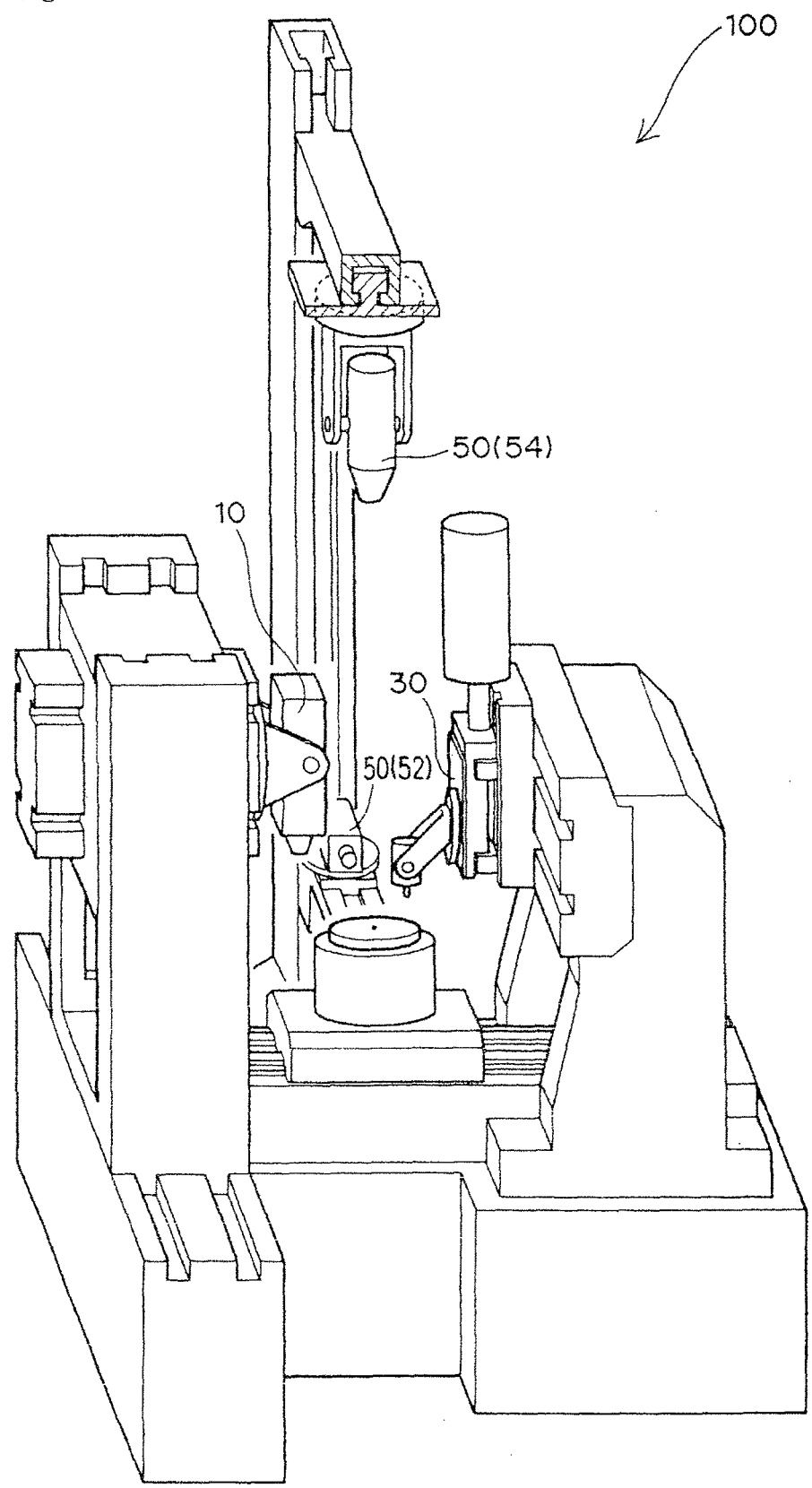
FIG. 1 is a perspective view schematically showing a constitution of a hybrid ultraprecision machining device.

With reference to the accompanying drawings, the present invention will be described in detail.

First, a basic structure of a hybrid ultraprecision machining device, which forms the basis of the present invention will be described. It should be noted that various components or elements are shown schematically in the drawings with dimensional proportions and appearances being not necessarily real since they are merely for the purpose of making it easy to understand the present invention.

The hybrid ultraprecision machining device is a device for manufacturing a micro-machined product from a workpiece. As schematically shown in FIG. 1, the hybrid ultraprecision machining device 100 comprises:

an electromagnetic-wave-machining means 10 for roughly machining the workpiece;

a precision-machining means 30 for precisely machining the roughly machined workpiece; and a shape-measurement means 50 for measuring a shape of the workpiece upon use of the electromagnetic-wave machining means 10 and the precision-machining means 30.

Figure 2:
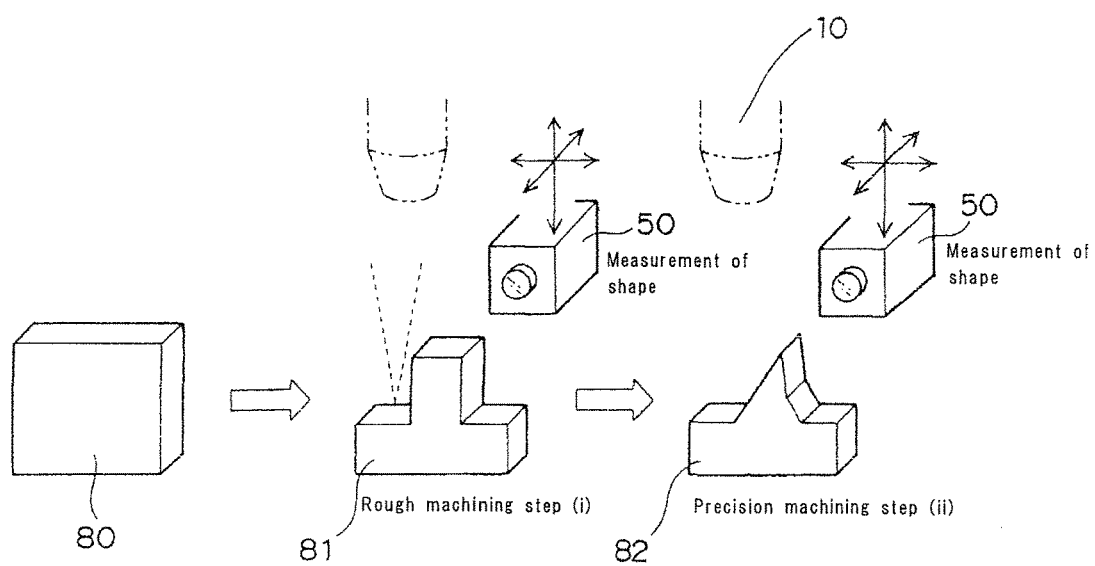
FIG. 2 is a schematic view for explaining characterizing features of a hybrid ultraprecision machining.

The hybrid ultraprecision machining device is characterized by being equipped with the electromagnetic-wave-machining means 10 serving to perform a rough machining, the precision-machining means 30 serving to a precision machining of the roughly workpiece by means of the cutting tool suitable for a micro machining (especially suitable for the micro machining of the roughly machined workpiece), and the shape-measurement means 50 serving to measure the shape of the workpiece upon the above machinings. See FIG. 2 as well as FIG. 1.

Figure 3:
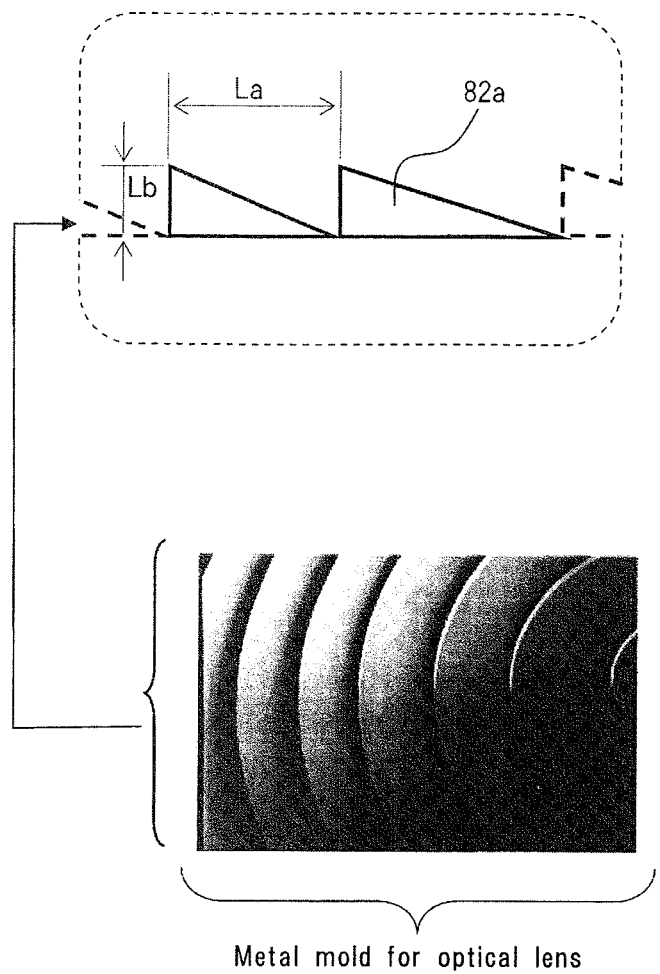
FIG. 3 shows a schematic diagram and an electron micrograph for explaining the size of a micro part of a micro-machined product.

The term "hybrid ultraprecision machining" as used in the present specification is intended for such an embodiment that the micro product with the fine structure is manufactured by a combination of "electromagnetic wave" and "precision machine", the dimension "La" or "Lb" (see FIG. 3) of the micro part of the product being in the range of several tens of nm to several mm, that is, in the range of about 10 nm to about 15 mm or about 10 nm to about 3 mm, more specifically in the range of several tens of nm to several tens of μm such as 10 nm to 500 μm and about 50 nm to 1 μm, or about 1 nm to about 1 μm in some cases. Thus, the term "ultraprecision machining" as used herein substantially means such an embodiment that an accurate machining of the workpiece is performed such that the machined workpiece has the micro part dimension "La" or "Lb" of several tens of nm to several mm as described above. In particular, the term "hybrid" as used herein substantially means a combination of two types of machinings, namely, "electromagnetic-wave machining" and "precision-machining".

As such, the hybrid ultraprecision machining device is particularly appropriate for the manufacturing of the micro product with the fine structure having the dimension of several tens of nm to several mm, that is, in the range of about 10 nm to about 15 mm, or about 10 nm to about 3 mm (for example in the range of several tens of nm to several tens of 1 μm such as 10 nm to 500 μm and 50 nm to 1 μm, or in some cases 1 nm to 1 μm). The micro product with the fine structure to be manufactured may have a complicated multi-surface shape or curved-surface shape. Examples of the micro product with the fine structure (that is, the product that can be manufactured by the hybrid ultraprecision machining device) may include a metal mold for optical lens (for example, a metal mold for micro-lens array), and a metal mold for glass lens, a metal mold for precision-injection molding, a metal mold for precision-metal machining) in a case where the workpiece is made of ultrahard materials (cemented carbide), or metal materials such as hardened steel (quenched steel), non-iron (e.g., Bs, Cu, and/or Al) and preharden steel. Furthermore, the hybrid ultraprecision machining device makes it possible to directly manufacture the products which are generally obtained by the above metal molds. For example, an optical lens (e.g., micro-lens array), a water-repellent plate, a mirror and a precision part can be manufactured, in which case the workpiece may be made of plastic material, metal material (e.g., aluminum steel), silicon material, glass material, mineral material, or polycrystalline diamond material. As such, the hybrid ultraprecision machining device does not limit the materials of the workpiece, and can perform a hybrid ultraprecision machining on the workpiece of inorganic materials (e.g., glass material and/or metal material), or on the workpiece of organic materials (e.g., polymer material).

The electromagnetic-wave-machining means 10 of the hybrid ultraprecision machining device 100 is used for roughly machining the workpiece. The term "roughly machining" as used herein means that a workpiece body to be removed is roughly removed. Specifically, the term "roughly machining" used in the present invention substantially means that a ratio of the body part to be removed from the workpiece to the whole thereof is in the range of 70 to 95 volume %, preferably in the range of 80 to 95 volume %, and more preferably in the range of 90 to 95 volume %.

The electromagnetic-wave-machining means serves to generate a wave or light having a frequency of 10 kHz to 500 kHz so that the part of the workpiece body is removed due to a heating action. It is preferred that the electromagnetic-wave-machining means is a laser machining means. In this regard, the hybrid ultraprecision machining device 100 is preferably equipped with a laser generator capable of irradiating the workpiece with a laser light. In a case where the electromagnetic-wave-machining means 10 is the laser machining means, it is preferred that the type of the laser is a solid-state laser, a fiber laser, a gas laser, or the like.

Figure 4:
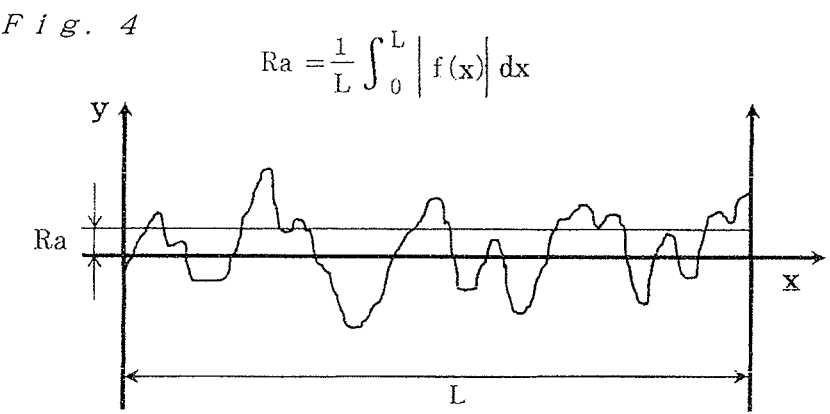
FIG. 4 is a diagram schematically showing the concept of arithmetic mean roughness (Ra).

The precision-machining means 30 of the hybrid ultraprecision machining device 100 is used for precisely machining the roughly machined workpiece. The term "precision machining" as used herein substantially means that the roughly machined workpiece is subjected to a cutting process under the cutting order of nm (for example, about 10 nm to 5000 nm, or about 50 nm to 1000 nm) so that the desired micro product with the fine structure is provided. It is particularly preferred that the "precision machining" produces the micro product with the fine structure having a surface roughness Ra of several nm to several hundreds of nm (for example, surface roughness Ra of about 2 nm to about 200 nm). The term "surface roughness Ra" as used herein corresponds to an arithmetic mean roughness. Thus, the surface roughness Ra substantially means a mean value calculated from the sum of absolute values of the deviations from the average line over the length L of an evaluation section that is set in the roughness curve as shown in FIG. 4 ("roughness curve" in this case corresponds to a section profile of the surface of the micro product with the fine structure). From another point of view regarding the surface roughness, the micro product with the fine structure can have a surface roughness Rz of 100 nm or less (that is, Rz=0 to 100 nm).

Figure 5:
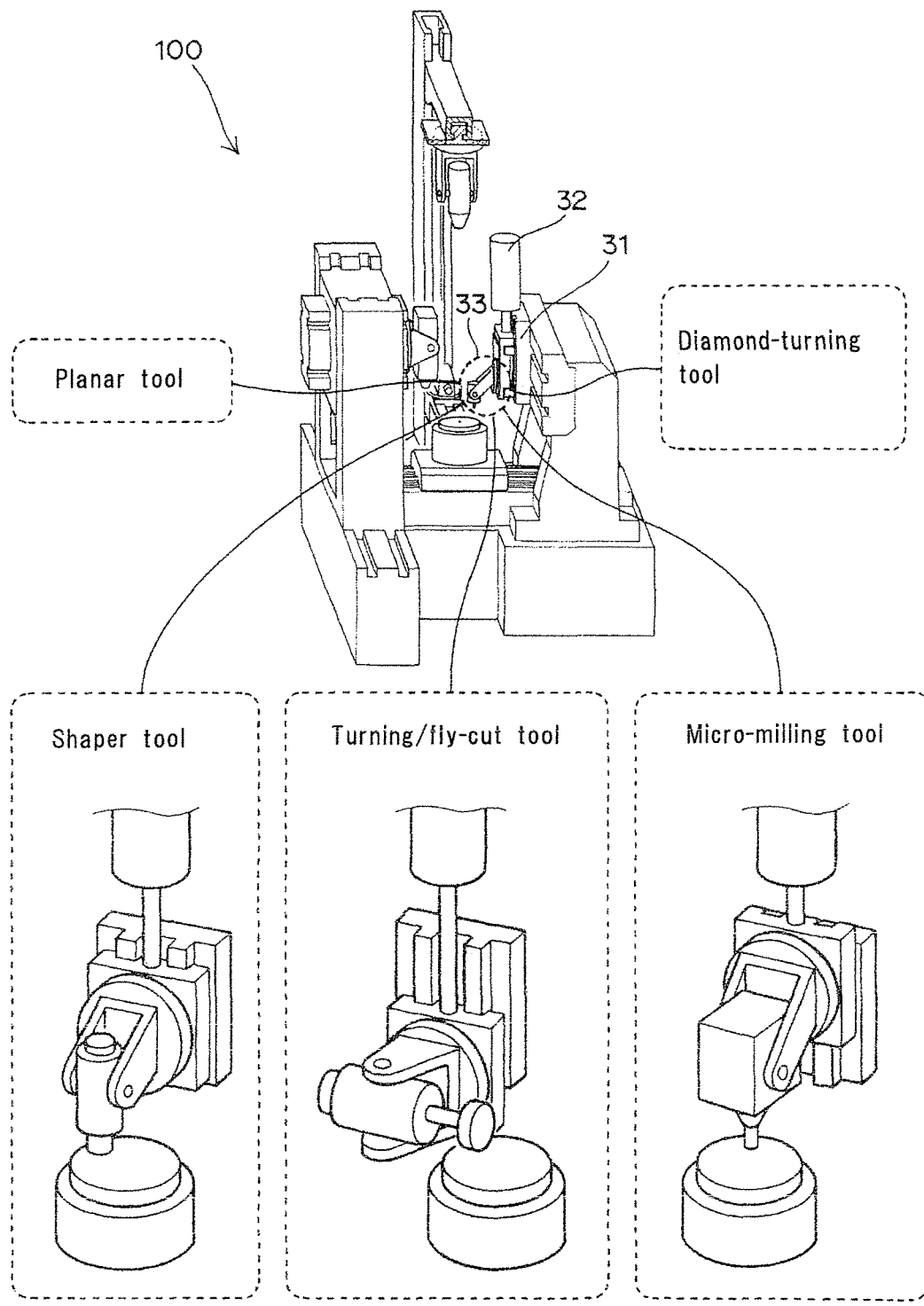
FIG. 5 is a perspective view schematically showing a precision-machining means/precision-machining process.

The precision-machining means 30 is equipped with the replaceable cutting tool selected from the group consisting of a planar tool, a shaper tool, a fly-cut tool, a diamond-turning tool and a micro-milling tool (see FIG. 5). That is, at least one cutting tool, preferably at least two cutting tool is/are provided in a replaceable state in the precision-machining means 30, and thereby at least one cutting process, preferably at least two cutting processes selected from the group consisting of a planar machining, a shaper machining, a fly-cut machining, a diamond-turning machining and a micro-milling machining is/are performed.

It is particularly preferred that at least one cutting tool selected from the group consisting of the shaper tool, the fly-cut tool, the diamond-turning tool and the micro-milling tool is replaceable in the precision-machining means.

As shown in FIG. 5, the precision-machining means 30 comprises a sliding platform 31 which has a function of a sliding movement in a horizontal direction, a motor for vertical-axis movement 32, and a machining head 33. The planar tool, the shaper tool, the fly-cut tool, the diamond-turning tool and/or the micro-milling tool may be replaceably disposed on the machining head 33. With respect to a replaceable mechanism of the precision-machining means, the cutting tool may be installed on the machining head, a feed mechanism, a table, or a main shaft by a screwing or fitting means. Alternatively, the cutting tool which has been in advance installed on the machining head or the like may be provided in such a movable state that the cutting tool is selectively used to perform the precision-machining of the workpiece.

Now, the cutting tools of the precision-machining means 30 will be described in detail.

Planar tool: This is a cutting tool for performing a so-called "planar machining (planing)". That is, the planar tool is a cutting tool for cutting the workpiece to produce a plane surface thereof. Typically, a byte tool is used as the planar tool. While a table with the workpiece mounted thereon is being moved horizontally, the byte tool is intermittently fed in the direction perpendicular to the movement direction of the table. As such, the planing process by the planar tool can be performed.

Figure 6:
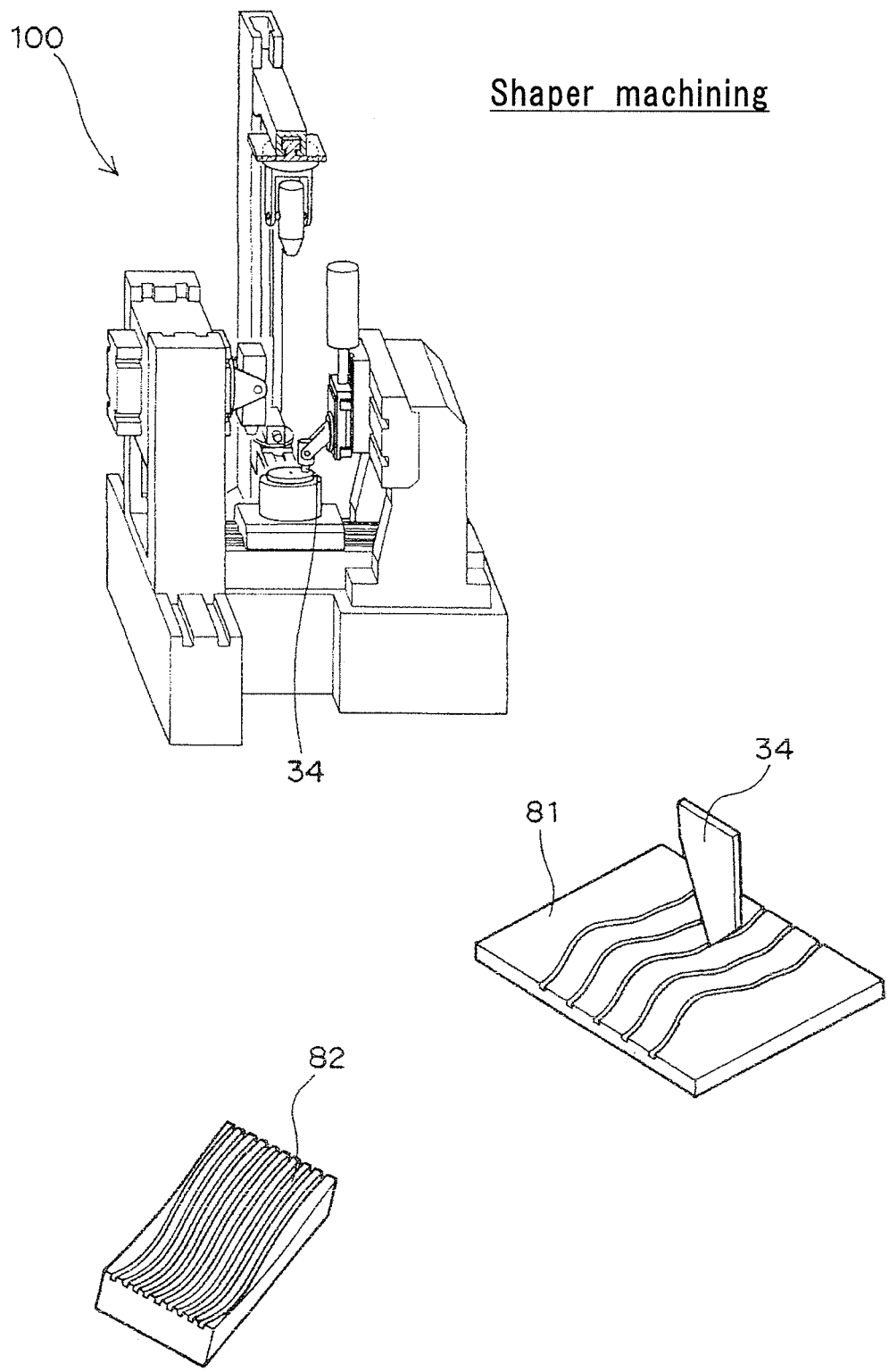
FIG. 6 is a perspective view schematically showing a shaper tool/shaper machining.

Shaper tool: This is a cutting tool for performing a so-called "shaper machining (shaping)". That is, a shaper tool 34 is a cutting tool for cutting the workpiece to mainly produce a non-planar surface, for example to produce a groove (see FIG. 6). Typically, a byte tool is used as the shaper tool. While a table with the workpiece mounted thereon is intermittently fed in the direction perpendicular to the movement direction of the byte tool, the reciprocating byte is brought into contact with the workpiece. As such, the shaping process by the shaper tool can be performed.

Figure 7:
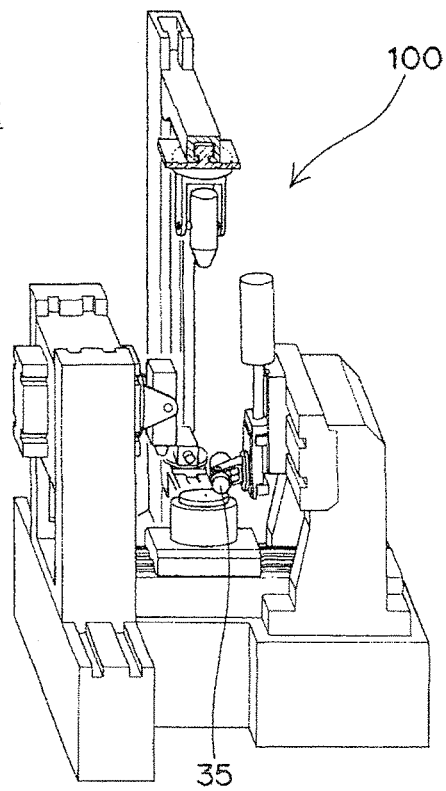
FIG. 7 is a perspective view schematically showing a fly-cut tool/fly-cut machining.
Figure 7:
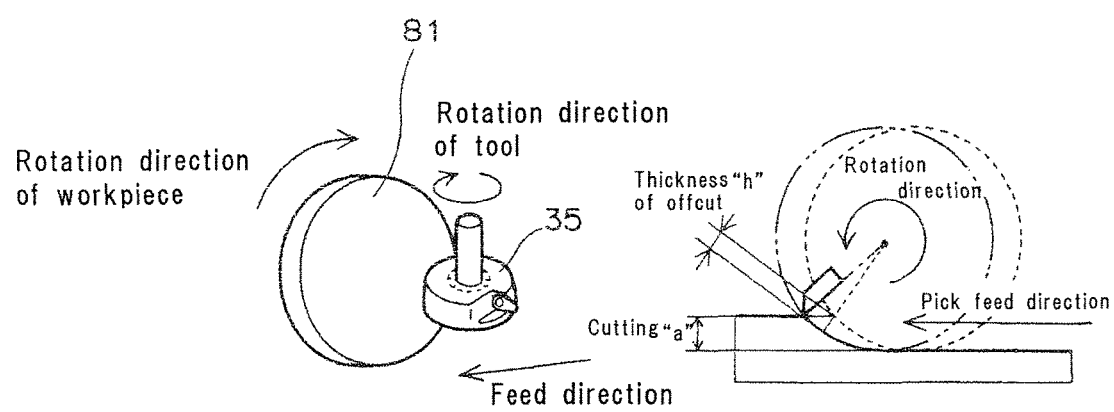

Fly-cut tool: This is a cutting tool for performing a so-called "fly-cut machining". Typically, a rotation tool is used as the fly-cut tool 35. While a rotation tool is being rotated, the rotation tool is fed to the workpiece (specifically, the workpiece with its position fixed) to cut the workpiece (see FIG. 7). The term "fly-cut" substantially means the same as the term "fly machining". However, the fly-cut may include such a machining mode that only one blade is used in the precision machining according to an embodiment of the present invention.

Figure 8:
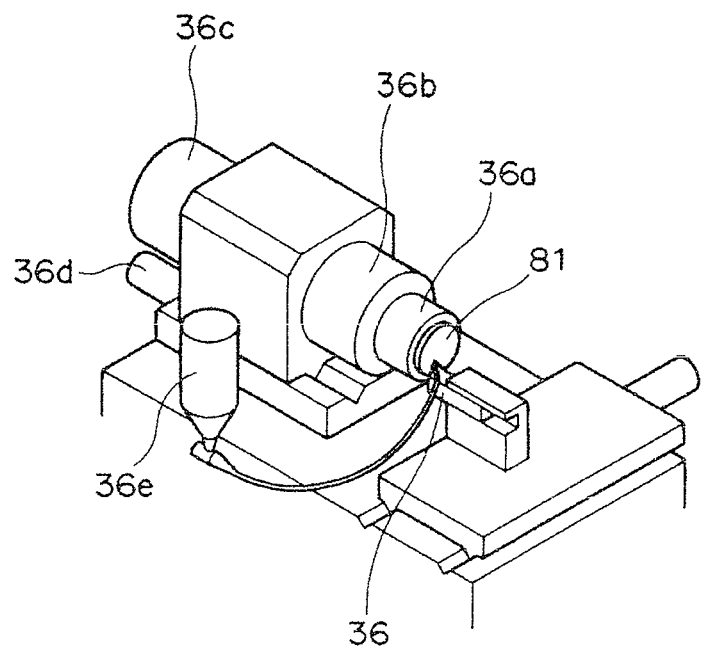
FIG. 8 is a perspective view schematically showing a diamond-turning tool/diamond-turning machining.
Figure 8:
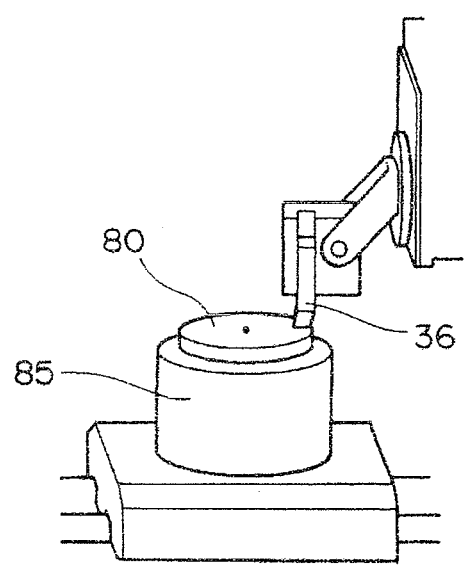

Diamond turning tool: This is a cutting tool for performing a so-called "single point diamond turning (SPDT)" or "ultraprecision turning machining". Typically, while the workpiece 81 is being rotated, a diamond tool 36 is brought into contact with the workpiece 81, and thereby the workpiece is machined so that it has the shape with its center positioned at the center of rotation (see FIG. 8).

Figure 9:
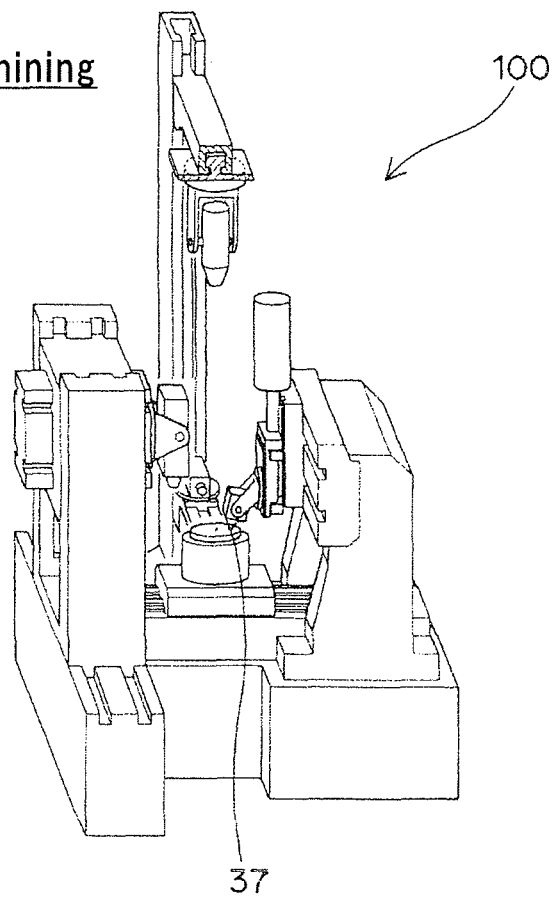
FIG. 9 is a perspective view schematically showing a micro-milling tool/micro-milling machining.
Figure 9:
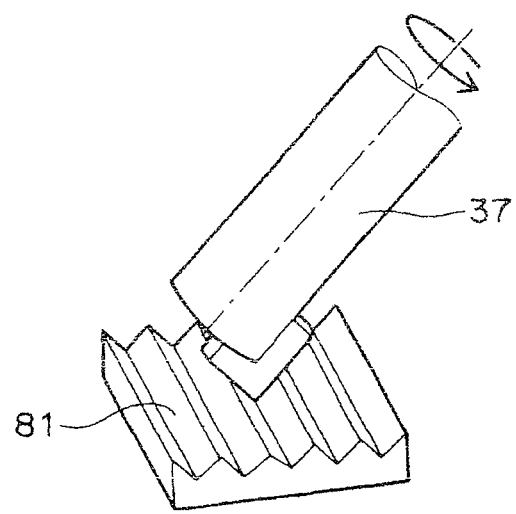

Micro milling tool: This is a cutting tool for performing a milling, for example "micro-milling". Typically, a rotation tool with a small diameter (for example, a diamond rotation tool) is used as the micro milling tool 37. While the rotation tool is being rotated, the rotation tool is brought into contact with the workpiece to reflect the shape of the tip edge of the tool blade in the workpiece or to form various shapes (see FIG. 9).

Figure 10:
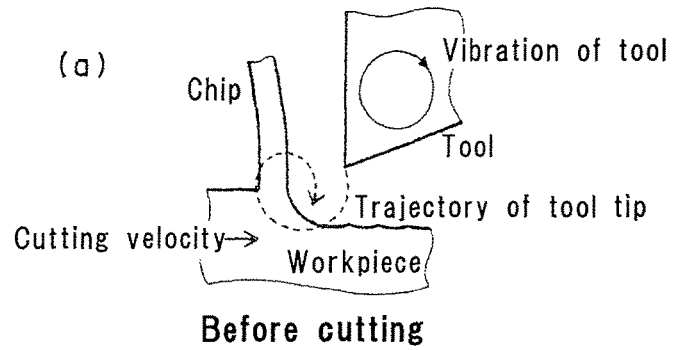
FIG. 10 (a)-(d) is a perspective view schematically showing a vibration cutting.
Figure 10:
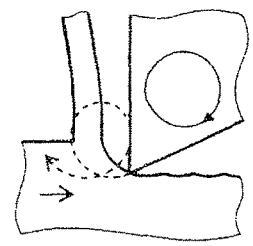
Figure 10:
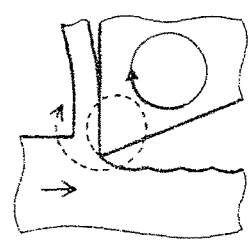
Figure 10:
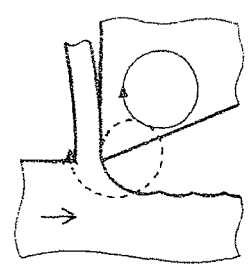

In the hybrid ultraprecision machining device 100, the precision-machining means 30 has an additional function of vibration cutting. That is, the above-mentioned cutting tool can be subjected to a vibration. For example, the cutting tool is attached to a driving piezoelectric element. The vibration cutting can provide the effects of "decreasing a cutting resistance", "preventing an adherence phenomenon in the tip edge of the tool blade" and "suppressing a distortion attributed to thermal action". The vibration cutting is preferably performed in a form of "ultrasonic wave elliptical vibration cutting". Specifically, the tip edge of the cutting tool is vibrated elliptically (see FIG. 10). The vibration cutting can effectively achieve a large reduction in the cutting resistance, the suppression of the generation of burr and chatter vibration, and a reduction in thickness of the chip.

The hybrid ultraprecision machining device 100 comprises the shape-measurement means 50. The shape-measurement means 50 is used for an onboard measuring of the shape of the workpiece upon the use of the electromagnetic-wave-machining means 10 and the precision-machining means 30. The term "shape measurement" substantially means that the shape and/or position of the workpiece are/is measured at a point in time at least one of before, during and after the machining process.

Examples of the shape-measurement means may include "imaging means", "a detector using a laser light", and the like. The imaging means may be a CCD camera, an infrared camera, a near-infrared camera, a mid-infrared camera, or a X-ray camera, for example. The "detector using the laser light" may be a laser microscope, or a laser interferometer, for example. Alternatively, a white light interferometry is possible for performing the measurement of the shape. Furthermore, the "contact-measurement means" may be preferably used. For example, the shape-measurement means may be a measurement device using a probe (three-dimensional indicator). In this regard, scanning probe microscopes such as a scanning tunneling microscope and an atomic force microscope may be used, for example.

Figure 11A:
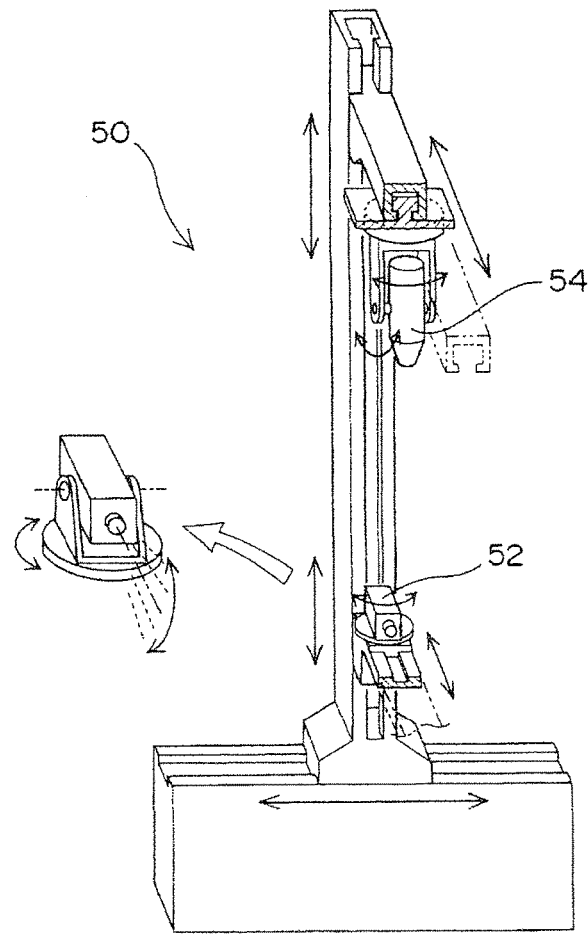
FIG. 11A is a perspective view schematically showing a shape-measurement means.

As shown in FIG. 11A and FIG. 1, the shape-measurement means 50 preferably includes a combination of "imaging means 52" and "detector 54 using the laser light". In this case, it is preferred that the position of the workpiece is identified by the "imaging means 52", and then the shape of the workpiece (especially, the shape of a part to be machined) is identified by the "detector 54 using the laser light".

Figure 11B:
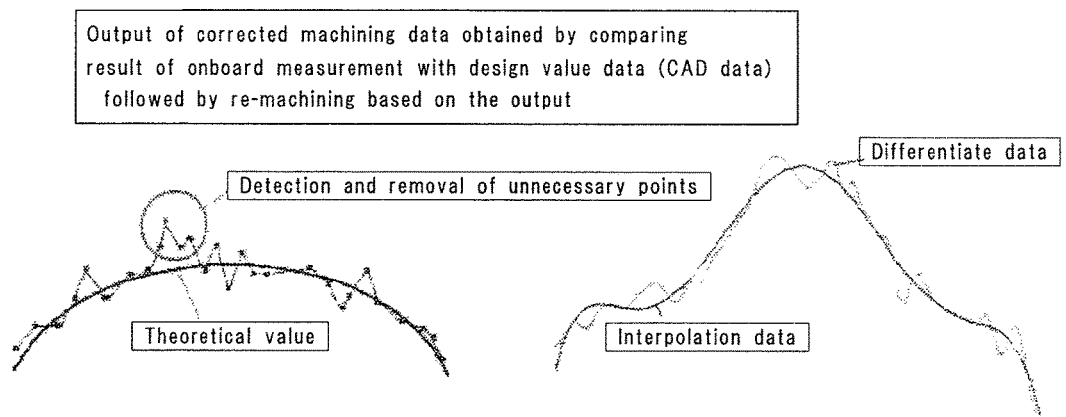
FIG. 11B is a perspective view schematically showing a creation of data for a correction machining.

Information on the shape and/or position of the workpiece measured by the shape measurement means 50 is fed back to the electromagnetic-wave-machining means 10 and the precision-machining means 30 to be used for the desired electromagnetic-wave machining and/or precision machining. Accordingly, the hybrid ultraprecision machining device comprises a control means (e.g., "computing means" to be described below) for controlling the electromagnetic-wave-machining means or the precision-machining means, based on the information on the shape of the workpiece, the shape being measured by the shape-measuring means. By way of example, upon performing the electromagnetic-wave machining and/or precision machining, the shape and/or position of the workpiece are/is measured by the shape-measurement means 50 in real time, and the measured data is utilized by the machining means. For example, data for a correction machining is created, based on "data measured by the shape-measurement means" and "data on a machining path of the electromagnetic-wave-machining means and/or the precision-machining means, the path being obtained from a model for the micro-machined product". The electromagnetic-wave machining and/or precision machining are/is performed based on the created data for the correction machining. See FIG. 11B. The hybrid ultraprecision machining device preferably includes a computing means for creating the data for the correction machining.

Figure 12:
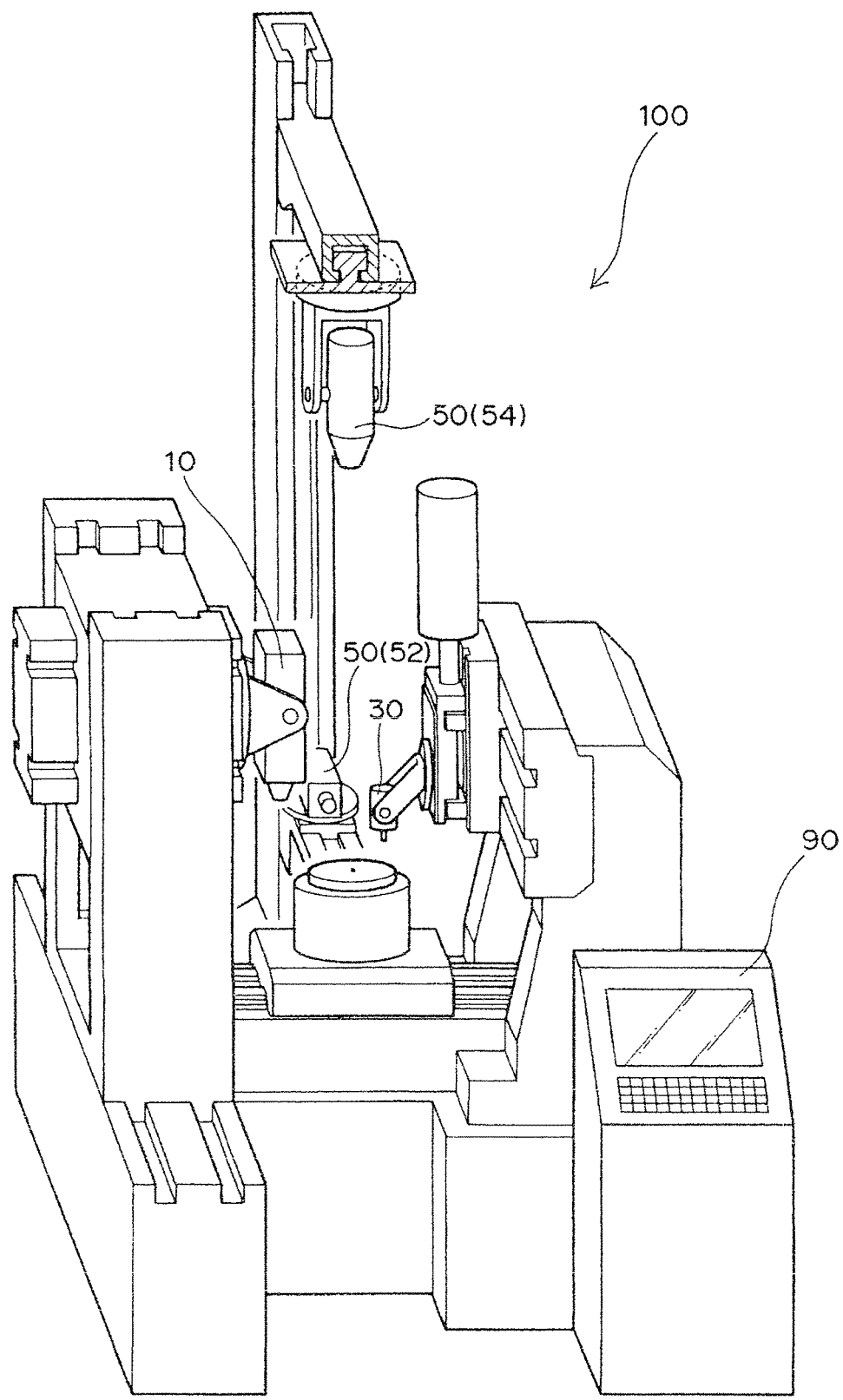
FIG. 12 is a perspective view schematically showing a computing means having a form of a computer.

The computing means may be for example in a form of a computer 90, as shown in FIG. 12. For example, it is preferred that the computer as the computing means is composed at least of a CPU, a primary storage device and a secondary storage device. The "data on a machining path of the electromagnetic-wave-machining means and/or the precision-machining means, the path being obtained from a model for the micro-machined product" stored in the storage device(s) of the computer is compared with the "data measured by the shape-measurement means". Then, a difference between these data is calculated, and thereby the data for the correction machining is provided. By way of example, during or after the machining process, the shape of the workpiece is measured to store the relationship between the workpiece material and the amount of deformation (error) as a database, whereby such database for the correction machining may be automatically created. It is preferred that the computing means can automatically create the machining path (particularly, the hybrid machining path) for the electromagnetic-wave machining means and/or precision machining means by a computation of numerical values from the model shape of the micro-machined product and the shape of the workpiece.

Figure 13A:
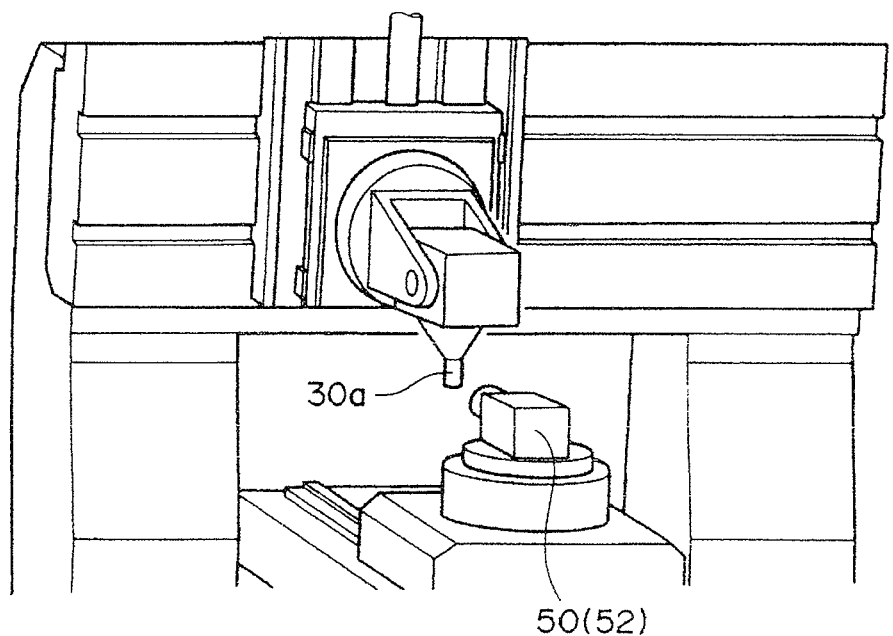
FIG. 13A is a perspective view schematically showing an embodiment wherein a shape/position of the tip of tool is measured.
Figure 13B:
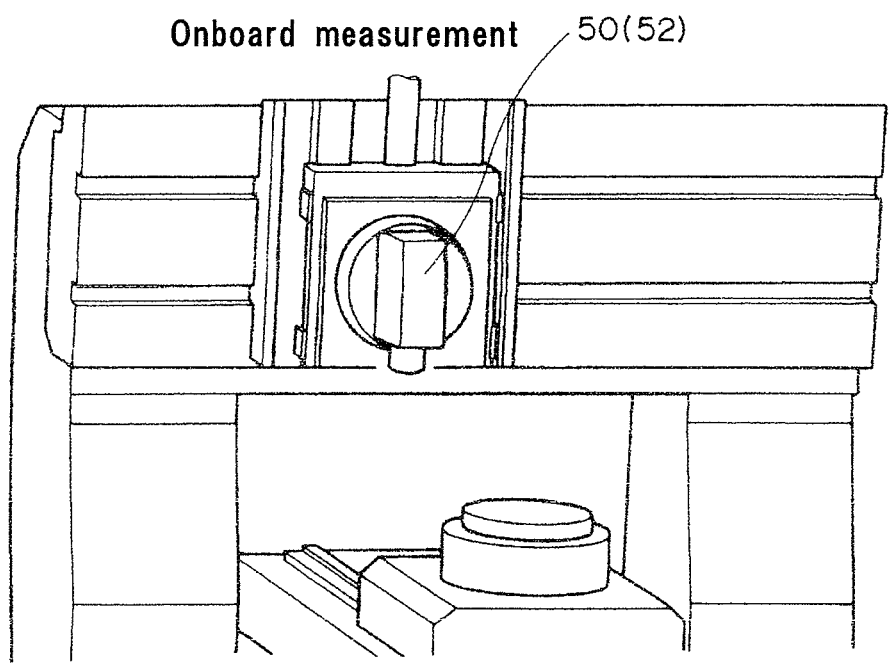
FIG. 13B is a perspective view schematically showing an embodiment wherein a shape-measurement means is provided movably in a vertical direction.

The shape-measurement means 50 may measure not only the shape and/or position of the workpiece, but also the shape and/or position of the tip 30a of the tool blade (see FIG. 13A). Even in this case, the resulting data and information are fed back to the electromagnetic-wave machining means 10 and/or the precision-machining means 30 to be used for the desired electromagnetic-wave machining and/or precision machining. For the onboard measurement, the shape measurement-means 50 may be provided movably in the vertical direction, as shown in FIG. 13B.

The hybrid ultraprecision machining device 100 can be embodied in various embodiments. Preferred embodiments of the present invention will be described below by way of example.

(Embodiment of Synchronization Control)

Figure 14:
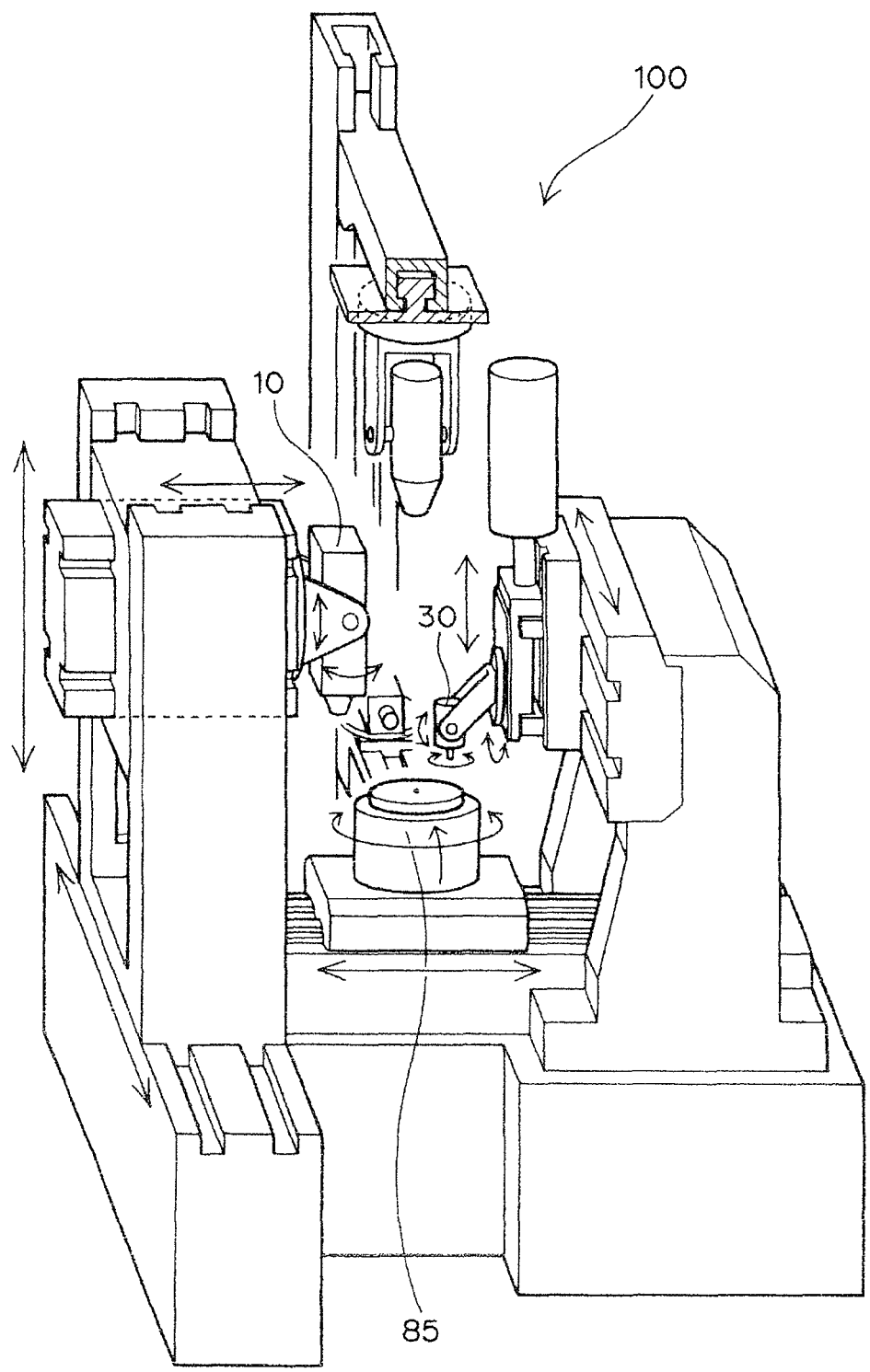
FIG. 14 is a perspective view schematically showing an embodiment wherein "operation of at least one axis of a table for mounting the workpiece" and "operation of at least one axis of a precision-machining means and/or an electromagnetic-wave-machining means" are controlled in synchronization with each other.

According to this embodiment, the hybrid ultraprecision machining device further comprises a controller for controlling an operation of at least one axis of a table for mounting the workpiece and an operation of at least one axis of a precision-machining means and/or an electromagnetic-wave-machining means in synchronization with each other. That is, as shown in FIG. 14, the controller is used for controlling the movement of the table 85 for mounting the workpiece in at least one direction, and also the movement of the precision machining means 30 and/or electromagnetic wave machining means 10 in at least one direction. Such controller may be provided in the above computing means, and thus may be for example in a form of the computer 90 (see FIG. 12). The controller of the hybrid ultraprecision machining device can furthermore shorten the machining time.

(Embodiment of Movability Regarding Laser Machining)

Figure 15:
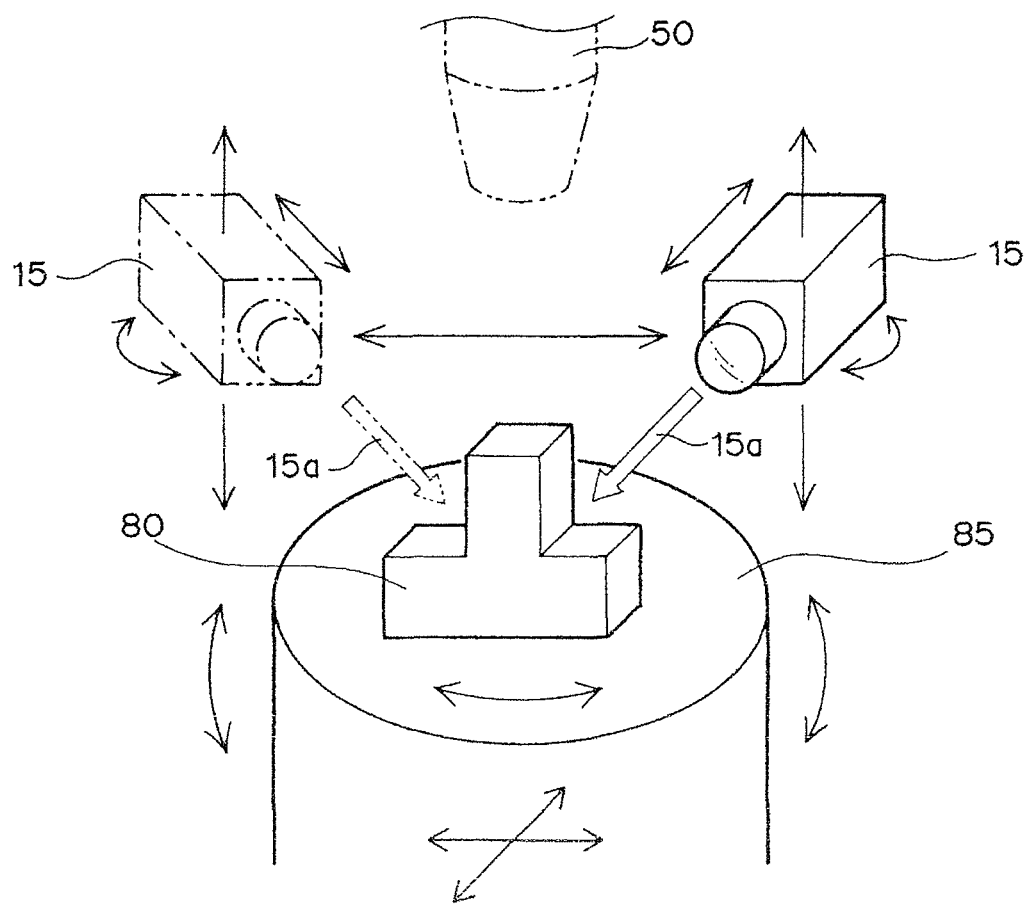
FIG. 15 is a perspective view schematically showing an embodiment wherein an angle of a laser incident light from a laser-machining means is adjustable with respect to a workpiece.
Figure 16:
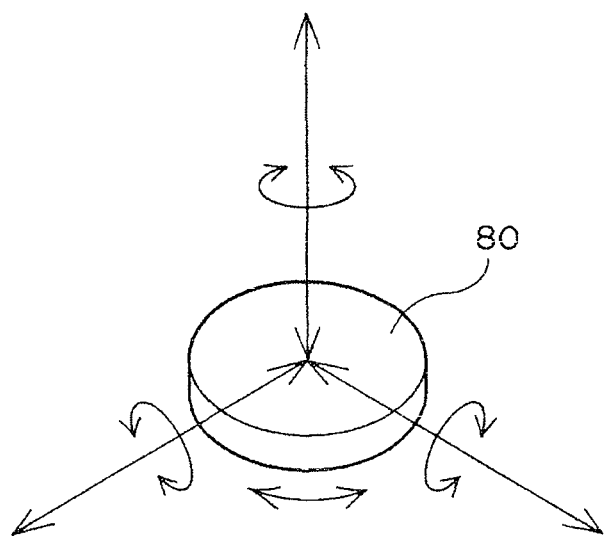
FIG. 16 is a perspective view schematically showing an embodiment wherein a workpiece is provided in a movable state along axes of a rotation direction, a horizontal direction and/or a vertical direction (e.g., workpiece in the movable state along maximum 6 axes as shown in FIG. 16).
Figure 17:
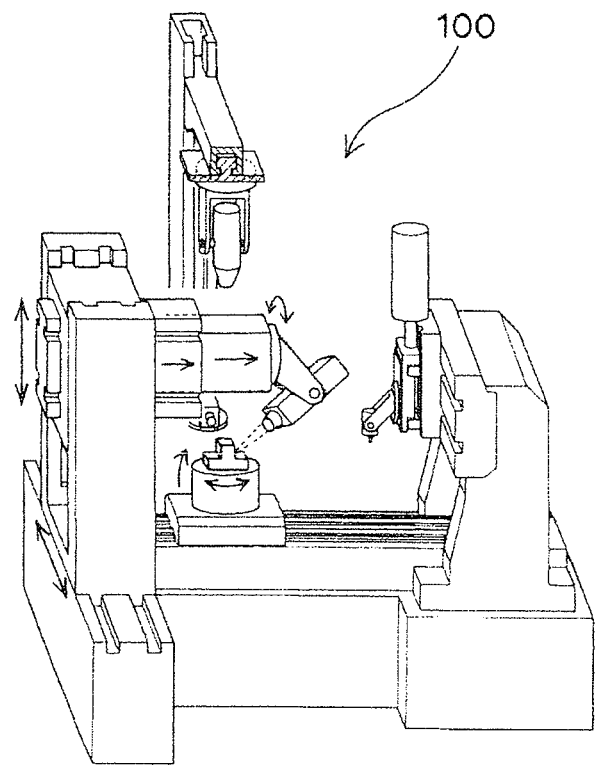
FIG. 17 is a perspective view schematically showing an embodiment wherein an orientation of the laser irradiation and/or a workpiece are/is adjusted according to a divergence angle or collection angle of laser, and thereby a vertical surface of the workpiece is machined.
Figure 17:
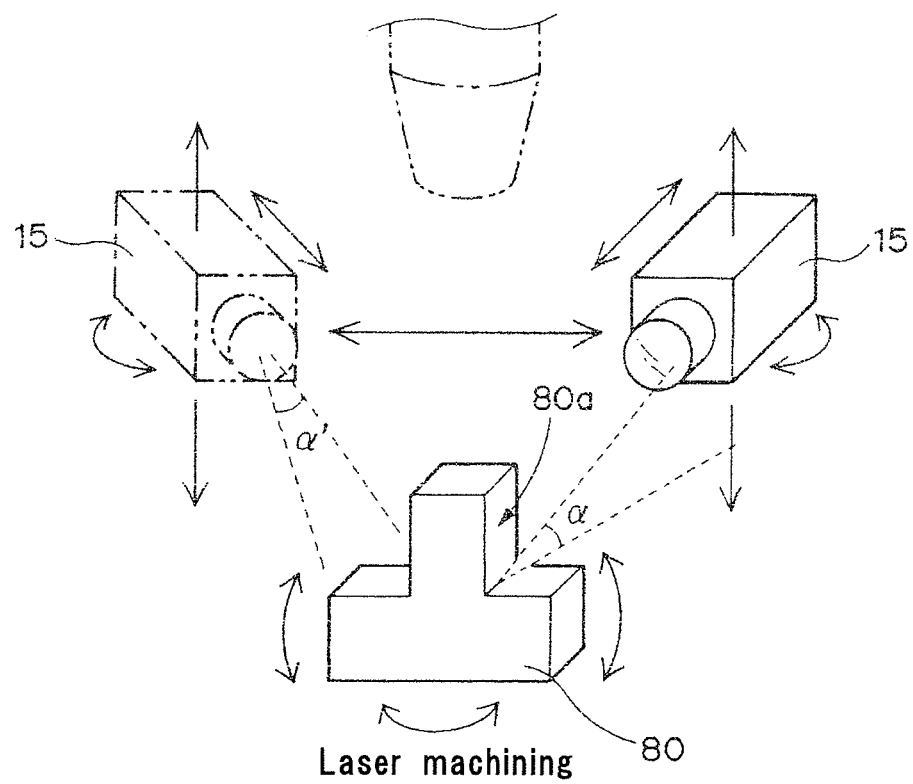

According to this embodiment, a table 85 for mounting the workpiece 80, and/or the laser-machining means 15 are/is movable as shown in FIG. 15, and thereby an angle of a laser incident light 15a from the laser-machining means is adjustable with respect to the workpiece 80. This makes it possible to more suitably manufacture the micro-machined product with its desired shape. The movable table 85 for mounting the workpiece 80 thereon has various moving mechanisms (for example, a cam mechanism or the like) allowing the workpiece 80 to move for example in the rotation direction, horizontal direction and/or vertical direction (see FIG. 16). The table may be movable so that it is in a tilted state. Likewise, the movable laser machining means 15 preferably has various moving mechanisms allowing the laser head or the like to move in the rotation direction, horizontal direction and/or vertical direction, for example. A vertical surface 80a of the workpiece 80 (or approximately vertical surface or small-tapered surface of the workpiece) can be machined by adjusting the orientation(s) of the laser irradiation and/or the workpiece according to a divergence angle $\alpha'$ or collection angle $\alpha$ of the laser irradiation (see FIG. 17).

(Embodiment of Various Different Types of Laser in Laser Machining Means)

According to this embodiment, the laser-machining means comprises a plurality of laser generators which are capable of generating different laser wavelengths from each other. That is, the hybrid ultraprecision machining device is equipped with a plurality of laser devices thereon, and thereby an optimal wavelength from among a plurality of laser wavelengths can be selected according to the material of the workpiece. This makes it possible to increase the flexibility in material of the workpiece. For example in a case where a metal mold for micro-lens array is manufactured as the micro-machined product, it is preferred that a laser device capable of generating a laser beam with a wavelength of 500 nm to 1100 nm, and another laser device capable of generating another laser beam with a wavelength of 200 nm to 400 nm are provided. In another case where a micro-lens array is manufactured as the micro-machined product directly from the workpiece made of glass or plastic material, a laser device capable of generating a laser beam with a wavelength of 300 nm to 1100 nm and a pulse width of several tens of ps to several hundreds of fs may be provided.

Figure 18:
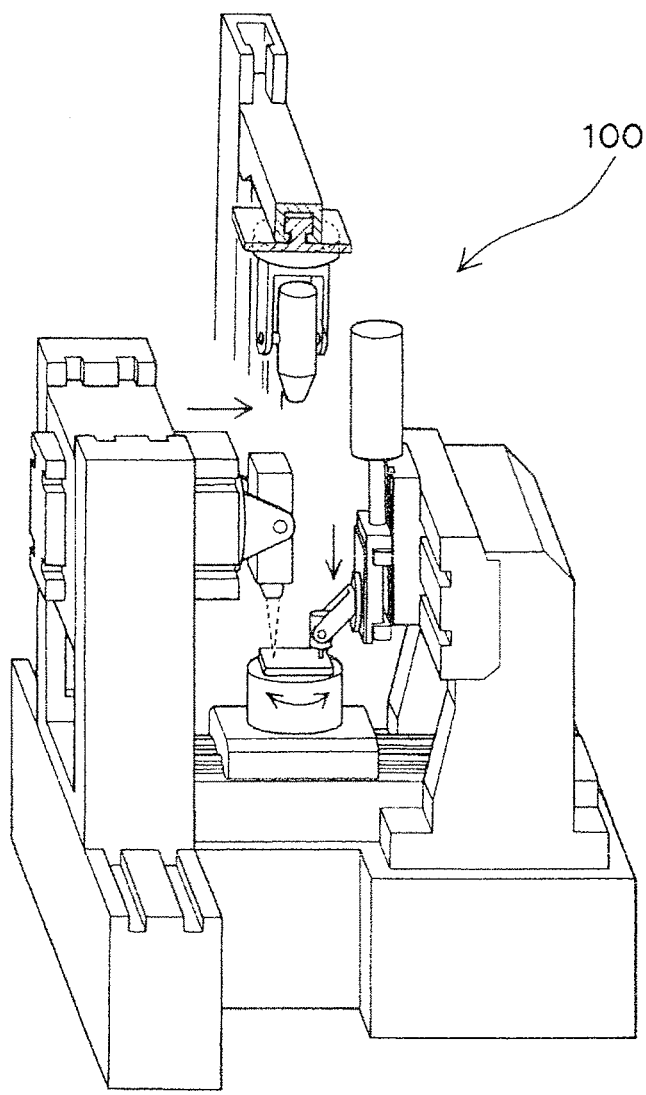
FIG. 18 is a perspective view schematically showing an embodiment wherein "rough machining performed by electromagnetic-wave machining" and "precision machining" are concurrently performed.
Figure 18:
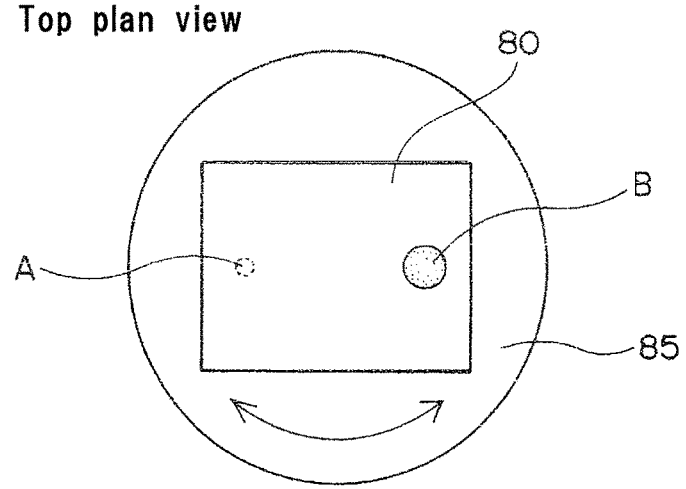
Figure 19:
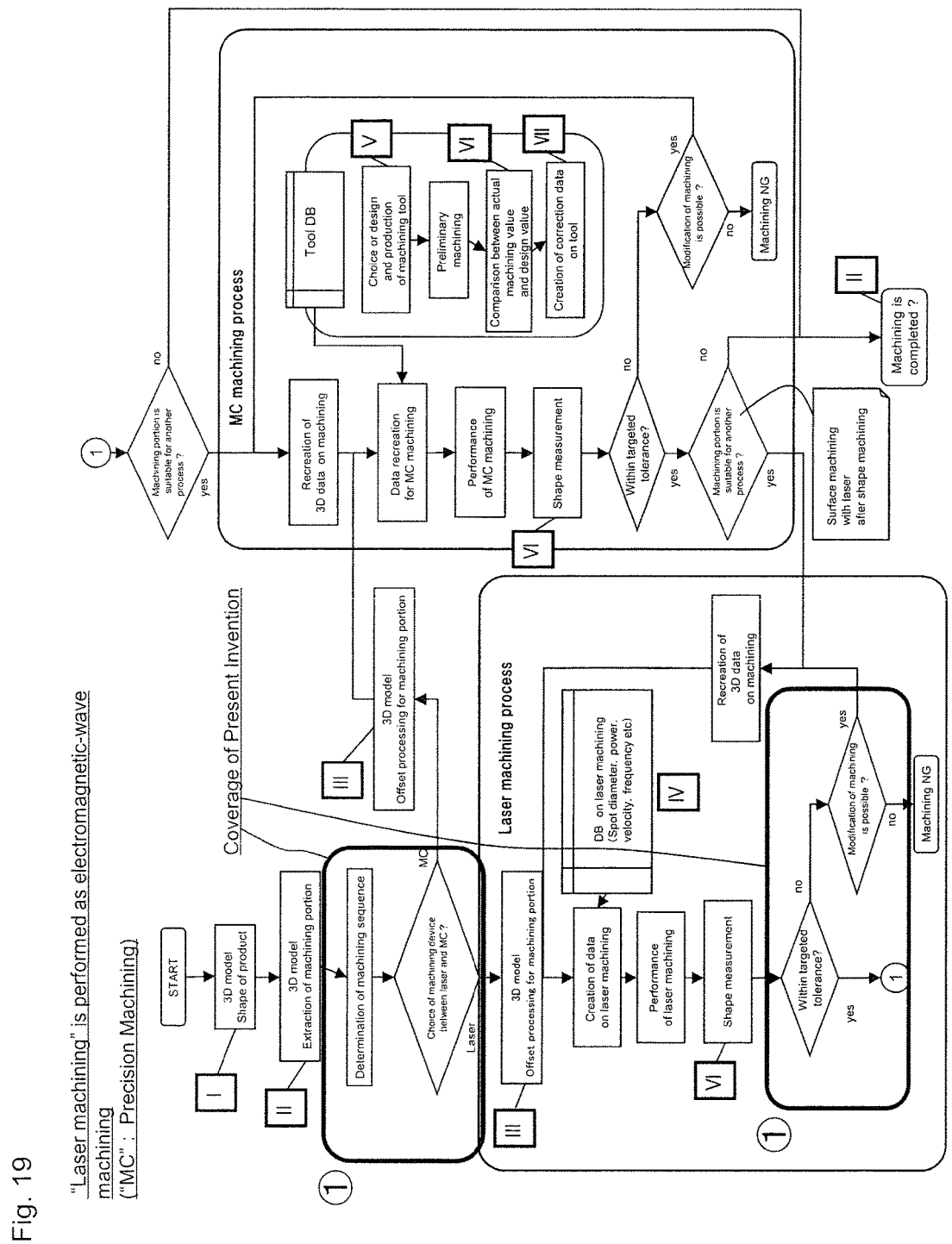
FIG. 19 is a flowchart showing a coverage of the present invention.

"Rough machining performed by electromagnetic-wave machining" and "precision machining" may be substantially performed concurrently. That is, "rough machining performed by electromagnetic-wave machining" and "precision machining" may be concurrently performed. More specifically, as shown in FIG. 19, a part "A" of the workpiece 80 may be roughly cut by the electromagnetic wave machining, whereas another part "B" of the workpiece 80 which has been already roughly cut may be subjected to the precision machining. As shown in FIG. 18, the workpiece may be subjected to both of the rough machining and the precision machining at the same time by implementing a rotation of the mounting table 85, for example.

[Determining Method of Machining Means according to Present Invention]

The present invention relates to a determining method of a machining means, the method being suitable for the above hybrid ultraprecision machining device 100. Specifically, a choice between the electromagnetic-wave-machining means and the precision-machining means is made, depending on an actual machining shape or area. The coverage of the present invention is shown in FIG. 19. As seen from FIG. 19, the determining method of the machining means according to the present invention is mainly performed at a point time before the manufacturing of the micro-machined product.

The detailed explanation on the present invention will be described. According to the determining method of the present invention, a choice is made between the electromagnetic-wave-machining means and the precision-machining means to be used for the hybrid ultraprecision machining device, on the basis of:

information on a stereoscopic model of the micro-machined product;

information on a removal volume to be removed from a volume of the workpiece in the manufacturing of the micro-machined product; and "data on a removal process time of the electromagnetic-wave-machining means" and "data on a removal process time of the precision-machining means".

Figure 20:
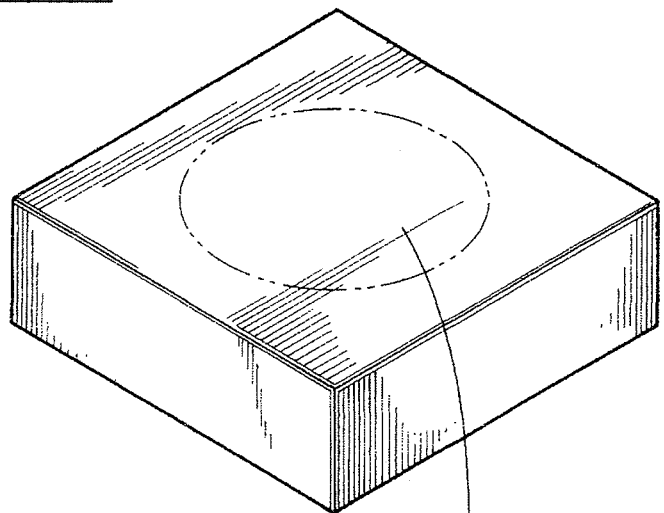
FIG. 20 is a view showing the concept of "removal volume to be removed from a volume of the workpiece in the manufacturing of the micro-machined product" and "stereoscopic model of the micro-machined product".
Figure 20:
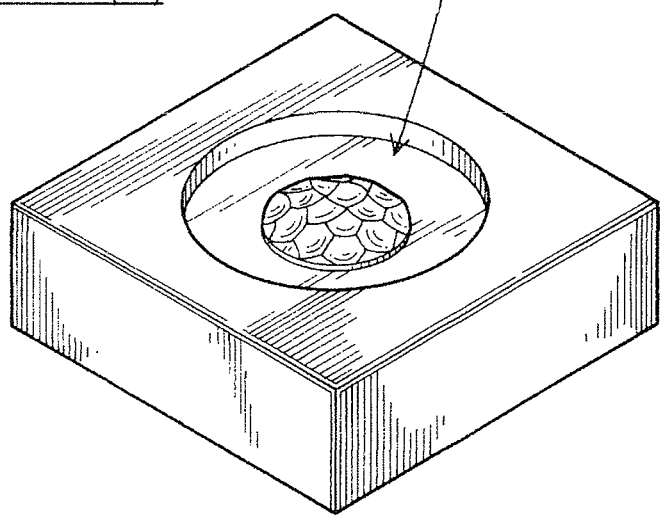

"Information on the stereoscopic model of the micro-machined product" is information on a targeted shape, i.e., information on a shape to be produced by the hybrid ultraprecision machining device. In other words, it is information on a final shape obtained from the workpiece by a machining process wherein the workpiece is partially removed, as shown in FIG. 20.

"Information on the removal volume to be removed from the volume of the workpiece in the manufacturing of the micro-machined product" is information on workpiece's volume to be removed by a machining process of the hybrid ultraprecision machining device. In other words, it is information on a removed volume of the workpiece, the removed volume being to be partially removed from the workpiece upon the production of the final shape from the workpiece, as shown in FIG. 20.

Figure 21A:
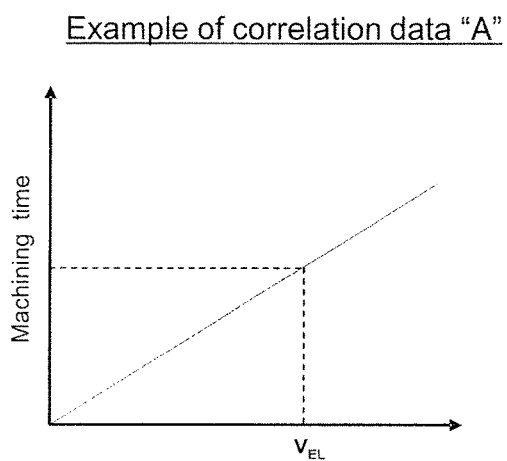
Figure 21B:
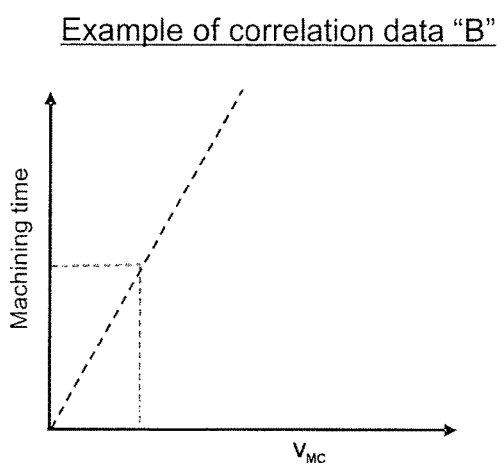

"Data on the removal process time of the electromagnetic-wave-machining means" is correlation data regarding the removal process time of the electromagnetic-wave-machining means. For example, it may be data on correlation data "A" between the removal volume and the removal process time with respect to the electromagnetic-wave-machining means (see FIG. 21A). Similarly, "data on the removal process time of the precision-machining means" is correlation data regarding the removal process time of the precision-machining means. For example, it may be data on correlation data "B" between the removal volume and the removal process time with respect to the precision-machining means (see FIG. 21B)

The present invention is characterized in that, by using the above information and data, a determination is made which of the electromagnetic-wave-machining means and the precision-machining means should be used. It is preferred that such determination is made especially by making use of three-dimensional CAD data. In other words, by making use of the three-dimensional CAD data on a final shape of the workpiece, an offset processing is preferably performed as a preprocessing for the manufacturing of the micro-machined product.

Figure 22A:
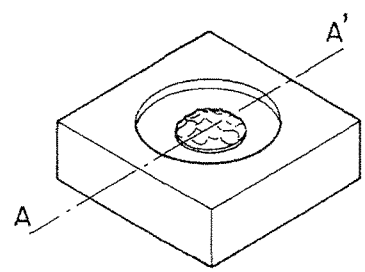
FIGS. 22A and 22B are views schematically illustrating an embodiment of a production of offset face.
Figure 22B:
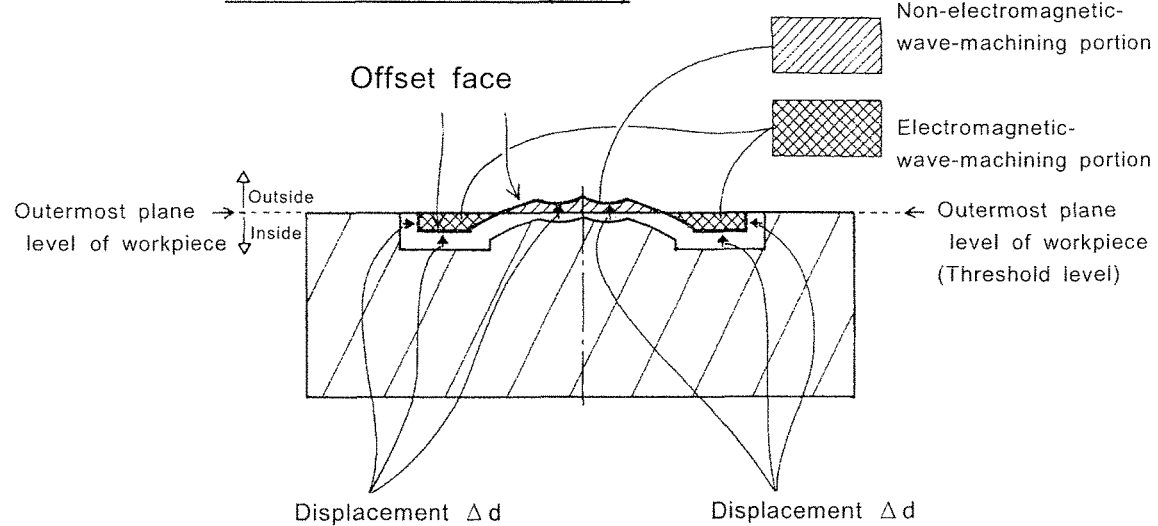

For example, as shown in FIGS. 22A and 22B, it is preferred that an offset face is produced by displacing each surface of the final shape by a designated amount, and thereafter the determination of whether the electromagnetic-wave-machining means should be used is made on the basis of whether or not such offset face is positioned inside of an outermost plane level of the workpiece (i.e., whether or not the offset face is positioned at the interior side of the workpiece from the outermost plane thereof). In other words, a contour of the final shape is displaced by the designated amount Δd to produce the offset face, and thereafter an electromagnetic-wave-machinable portion is determined on the basis of whether or not the offset face protrudes from the outermost plane level of the workpiece. The term "offset" as used herein means a computer processing (particularly, a three-dimensional CAD processing) in which respective surfaces of the object are displaced by a given amount of distance. For example, the respective surfaces of the final shape of the workpiece are displaced in their own normal directions with respect to such respective surfaces. From a viewpoint of an actual processing, the offset face can be produced by making use of a CAD software NX (Siemens) wherein "Surface" on model is selected, and then "Offset Surface Command" is implemented. While on the other hand, the phrase "the offset face is positioned inside of an outermost plane level of the workpiece" as used herein means that at least part of the offset face is located on the inside of the workpiece with respect to a surface level of the workpiece at a point in time before a removing process is performed. In other words, such phrase means that at least part of the offset face is located not on the outside of the original workpiece but on the inside thereof (see FIG. 22B).

Figure 23A:
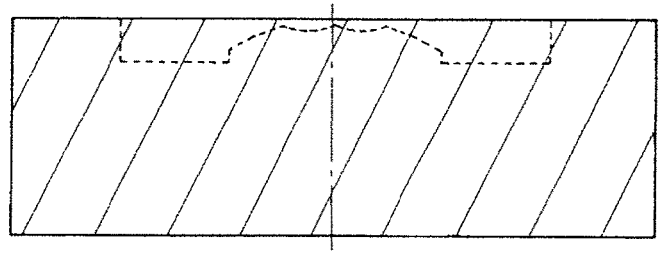
Figure 23A:
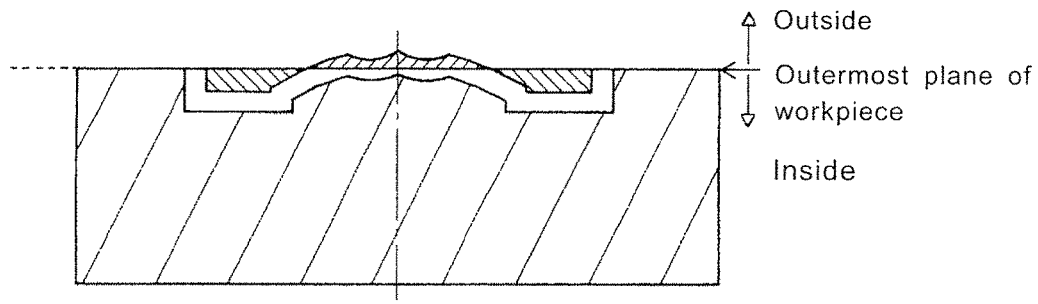
Figure 23B:
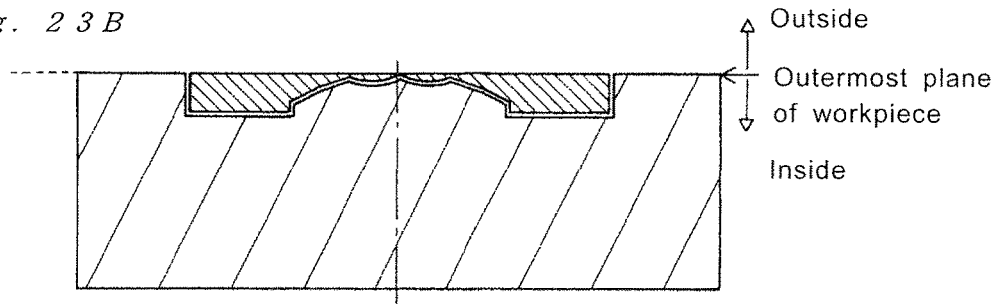
Figure 23C:
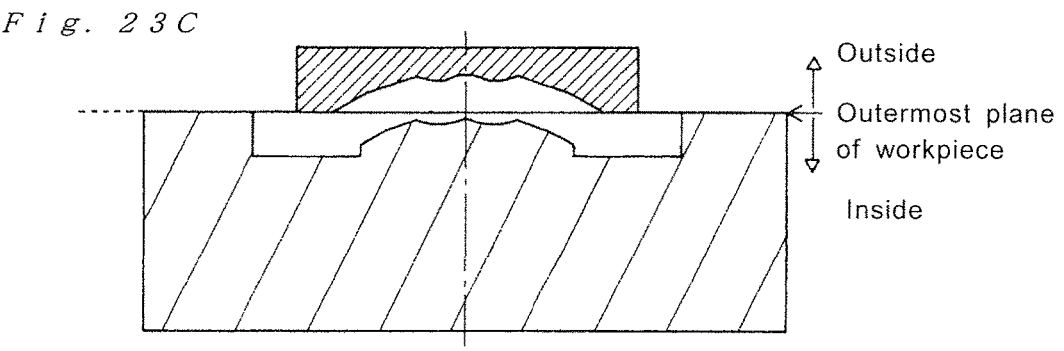

The offset face may have three different kinds of forms as shown in FIGS. 23A to 23C. With respect to FIG. 23A, a part of the offset face is located on the inside of the outermost plane level of the workpiece, whereas the other of the offset face is located on the outside of the outermost plane level of the workpiece. In this case, a region located at the interior side of the workpiece from the outermost plane thereof is regarded as an electromagnetic-wave-machinable portion. While on the other hand, another region located at the exterior side of the workpiece from the outermost plane thereof is regarded as a non-electromagnetic-wave-machinable portion. More specifically, a machinable portion for electromagnetic-wave machining is tentatively defined by a region enclosed by the outermost plane level of the workpiece and a part of the offset face, the part being positioned inside of the outermost plane level of the workpiece. While on the other hand, a non-machinable portion for electromagnetic-wave machining is defined by a region enclosed by the outermost plane level of the workpiece and another part of the offset face, the another part being positioned outside of the outermost plane level of the workpiece. With respect to FIG. 23B, all the parts of the offset face are located on the inside of the outermost plane level of the workpiece. In this case, an entire region located at the interior side of the workpiece from the outermost plane thereof is regarded as the electromagnetic-wave-machinable portion. With respect to FIG. 23C, all the parts of the offset face are located on the outside of the outermost plane level of the workpiece. In this case, an entire region located at the exterior side of the workpiece from the outermost plane thereof is regarded as the non-electromagnetic-wave-machinable portion.

Figure 24:
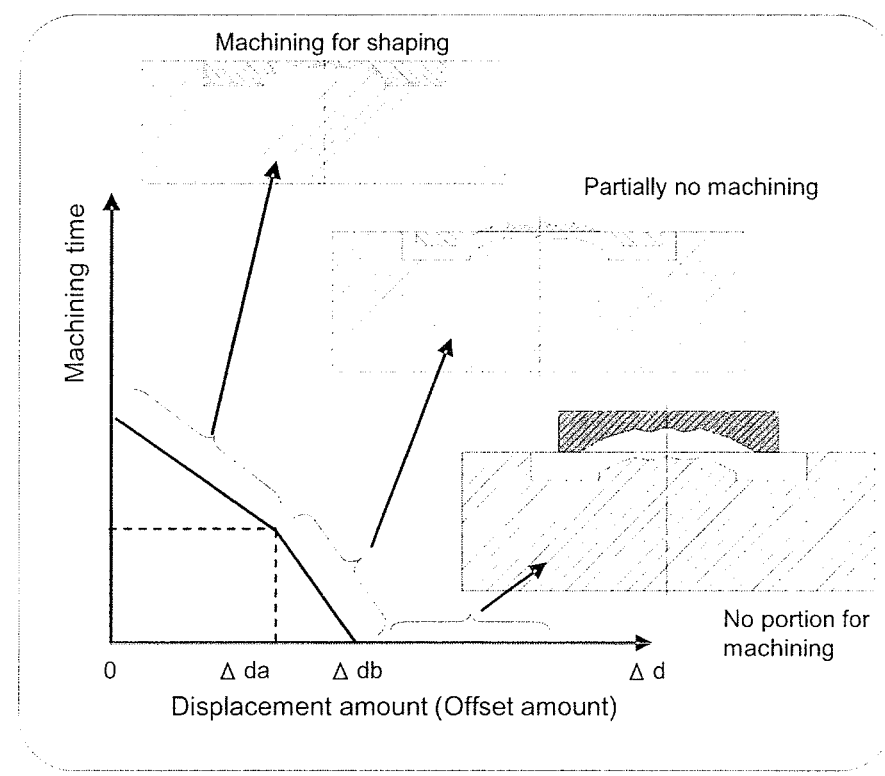
FIG. 24 is a graph showing a relationship between offset amount and machining time.

The above scheme makes use of the offset processing in which the electromagnetic-wave-machinable portion is determined depending on the thickness dimension of the removed portion of the workpiece, i.e., the removed volume of the workpiece. The displacement amount in the offset processing, i.e., Δd may be associated with the electromagnetic-wave-machining condition. In light of this, the above scheme can be regarded as a determination processing of whether the electromagnetic-wave-machining means should be used according to the thickness or amount of the removed portion of the workpiece (see FIG. 24).

Figure 25:
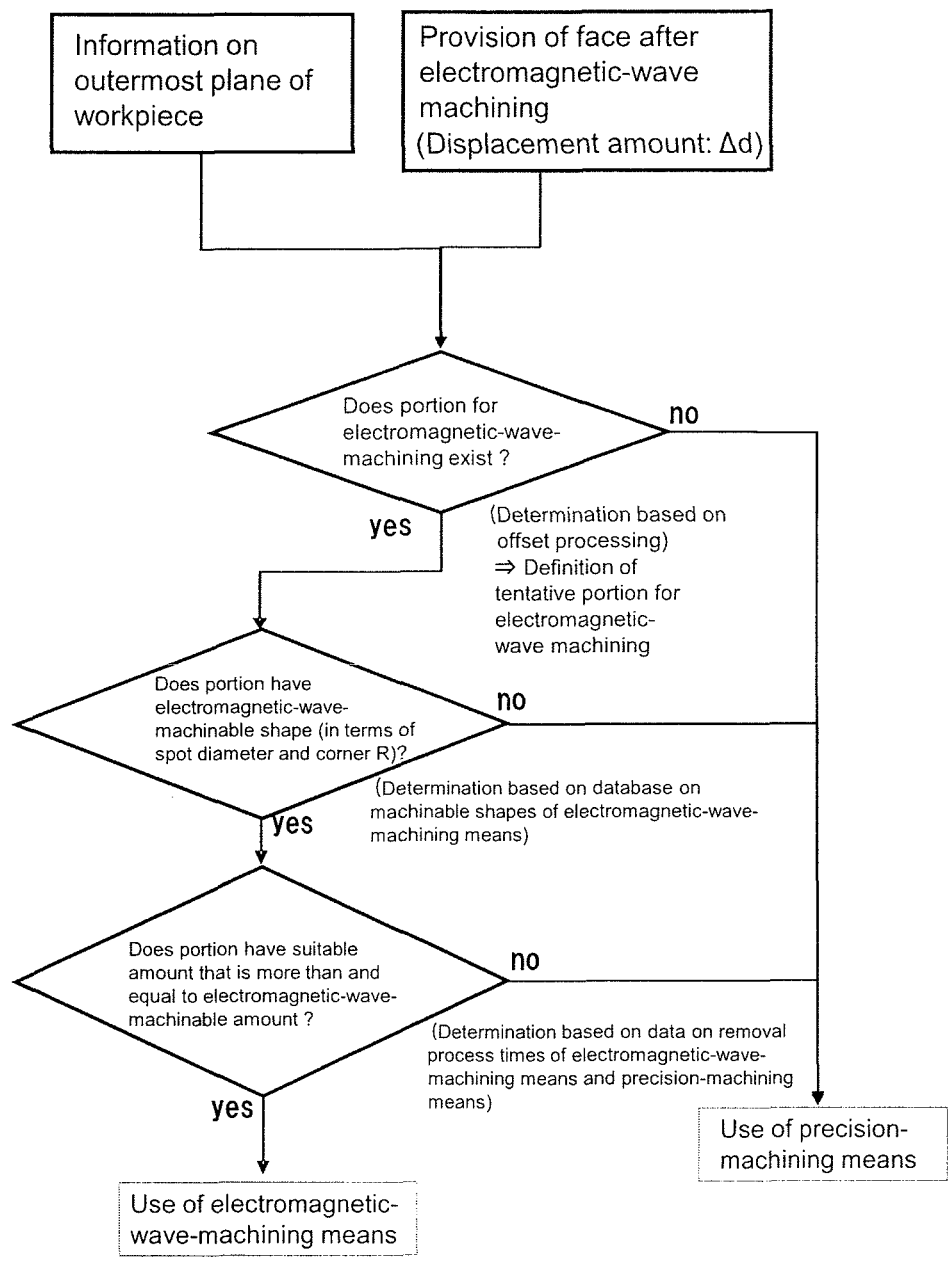
FIG. 25 is a flow in which "determination using the offset processing (definition of tentative electromagnetic-wave machining)", "determination of whether or not the tentative portion has an electromagnetic-wave-machinable shape" and "determination of whether or not the tentative portion has an amount that is more than and equal to an electromagnetic-wave-machinable amount" are sequentially performed.

In addition to the determination using the offset processing, it is preferable to determine whether or not a tentative machining portion obtained by the above processing has an electromagnetic-wave-machinable shape and/or whether or not such tentative machining portion has a suitable amount that is more than and equal to an electromagnetic-wave-machinable amount (see FIG. 25). Namely, the additional determination is performed with respect to a tentative portion for electromagnetic-wave machining, the tentative portion being defined by the above offset processing.

Figure 26A:
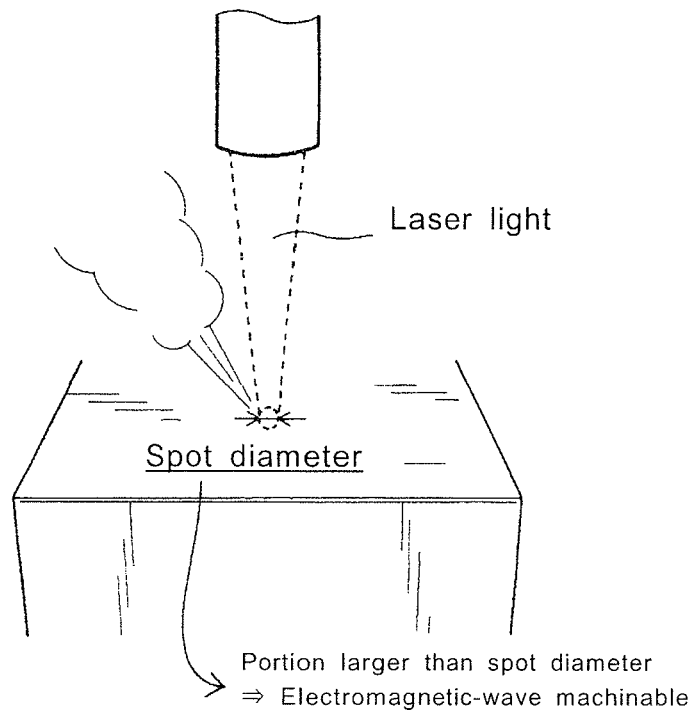
Figure 26B:
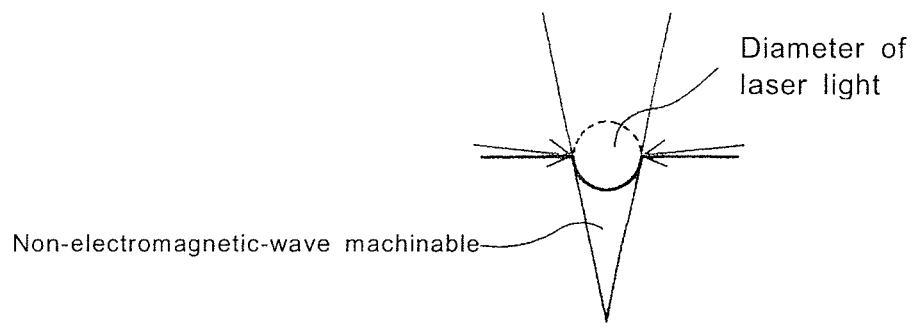

With respect to the determination of whether or not the tentative portion has the electromagnetic-wave-machinable shape, it is preferably performed based on a database on a machinable shape of the electromagnetic-wave-machining means. In other words, it is preferred that a shape of the tentative portion for electromagnetic-wave machining is compared with a machinable shape stored in the database on the electromagnetic-wave-machining means to determine whether or not the electromagnetic-wave-machining means should be used. For example, as shown in FIGS. 26A and 26B, the tentative portion is compared with the machinable shape in terms of "spot diameter" and "corner R", and thereby it is determined whether or not the electromagnetic-wave-machining means should be used. The spot diameter is a diameter of laser beam on the workpiece. When the tentative portion of the workpiece is larger than the spot diameter, such portion is regarded as being electromagnetic-wave machinable (see FIG. 26A). While on the other hand, when the tentative portion of the workpiece is smaller than the spot diameter, such portion is regarded as being non-electromagnetic-wave machinable (see FIG. 26A). With respect to "corner R", a taper-like shape of the workpiece, where an extra removal might occur upon the irradiation of the electromagnetic-wave beam (e.g., laser beam), is regarded as being non-electromagnetic-wave machinable (see FIG. 26B).

Figure 21C:
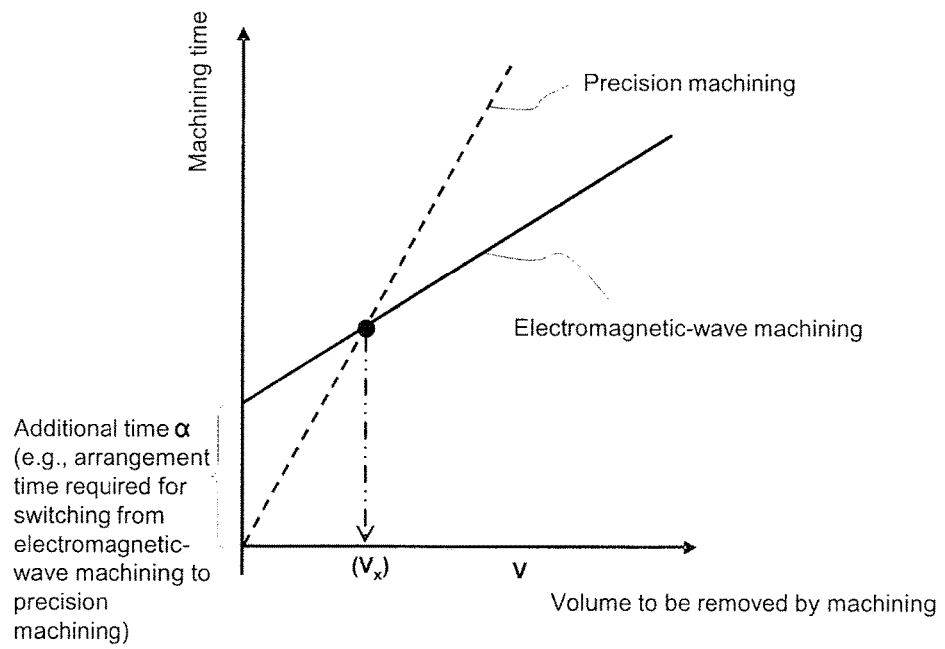
FIG. 21C is correlation data between a removal volume and a removal process time in consideration of arrangement time.

With respect to the determination of whether or not the tentative portion has the amount that is more than and equal to the electromagnetic-wave-machinable amount, it is preferably performed based on the removal process times regarding the electromagnetic-wave-machining means and the precision-machining means. In other words, it is preferred that a volume of the tentative portion for electromagnetic-wave machining is calculated, and thereafter a machining time "A" of the calculated volume based on correlation data "A" between the removal volume and the removal process time with respect to the electromagnetic-wave-machining means is obtained (see FIG. 21A), and also a machining time "B" of the calculated volume based on correlation data "B" between the removal volume and the removal process time with respect to the precision-machining means is obtained (see FIG. 21B), and thereafter the machining time "A" and the machining time "B" are compared with each other to determine whether or not the electromagnetic-wave-machining means should be used. As shown in FIG. 21C, an arrangement time required for a switching from the electromagnetic-wave-machining means to the precision-machining means may be additionally taken into account in the comparison between the machining time "A" and the machining time "B". Specifically, according to the graph of FIG. 21C, when the volume of the tentative portion for electromagnetic-wave machining is larger than "$V_x$", the electromagnetic-wave machining makes it possible to shorten the machining time as a whole. While on the other hand, when the volume of the tentative portion for electromagnetic-wave machining is smaller than "$V_x$", then not the electromagnetic-wave machining but the precision machining makes it possible to shorten the machining time. These determinations are due to the fact that the hybrid ultraprecision machining device has two different kinds of machining means of "electromagnetic-wave-machining means for rough machining" and "precision-machining means for precise machining". The present invention can select an optimum machining in consideration of the switching operation between the electromagnetic-wave-machining means and the precision-machining means.

In the determining method of the machining means, "determination using the offset processing (i.e., definition of the tentative portion for electromagnetic-wave machining)", "determination of whether or not the tentative portion has the electromagnetic-wave-machinable shape" and "determination of whether or not the tentative portion has a suitable amount that is more than and equal to the electromagnetic-wave-machinable amount" are sequentially performed. More specifically, the following (a) to (c) are sequentially performed to determine which of the electromagnetic-wave-machining means and the precision-machining means should be used.

(a) The offset processing is performed, and thereafter the existence of the electromagnetic-wave-machinable portion is tentatively judged on the basis of whether or not the offset face protrudes from the outermost plane level of the workpiece. That is, the tentative portion for electromagnetic-wave machining is defined.

(b) The shape of the tentative portion for electromagnetic-wave machining is compared with the machinable shape stored in the database on the electromagnetic-wave-machining means in order to determine whether or not the electromagnetic-wave machining is suitable.

That is, it is determined whether or not the electromagnetic-wave-machining means should be used in view of "shape" of the tentative portion.

(c) The comparison between the machining time "A" of the electromagnetic-wave-machining means and the machining time "B" of the precision-machining means is performed in consideration of the arrangement time required for the switching between the electromagnetic-wave-machining means and the precision-machining means in order to determine whether or not the tentative portion has a suitable volume to be removed by the electromagnetic-wave machining. That is, it is determined whether or not the electromagnetic-wave-machining means should be used in view of "required machining time for removal volume, such required machining time being in consideration of the arrangement time".

In order to expand a versatility of the determining method of the machining means according to the present invention, it is preferred for example in the above (c) that correlation data regarding each of various materials of the workpiece is used. In other words, it is preferable to have a database on the correlation between the removal volume and the machining time for each of materials of the workpiece and each of the machining means. This makes it possible to more suitably perform the machining process even when the material of the workpiece is changed.

[Hybrid Ultraprecision Machining Device of Present Invention]

Next, a hybrid ultraprecision machining device according to the present invention will be described. The hybrid ultraprecision machining device of the present invention comprises:

an electromagnetic-wave-machining means for roughly machining the workpiece;

a precision-machining means for precisely machining the roughly machined workpiece; and a shape-measurement means for measuring a shape of the workpiece upon use of the electromagnetic-wave machining means and the precision-machining means. Since "electromagnetic-wave-machining means", "precision-machining means" and "shape-measurement means" have been already described above, the description thereof is omitted here in order to avoid the duplicated explanation.

In particular, the hybrid ultraprecision machining device of the present invention is characterized in that it further comprises a system provided with a memory in which machining data for the machining device is stored. Such machining data is data for making a choice of which of the electromagnetic-wave-machining means and the precision-machining means should be used on the basis of:

information on a stereoscopic model of the micro-machined product;

information on a removal volume to be removed from a volume of the workpiece in the manufacturing of the micro-machined product; and data on a removal process time of the electromagnetic-wave-machining means and data on a removal process time of the precision-machining means.

Figure 27:
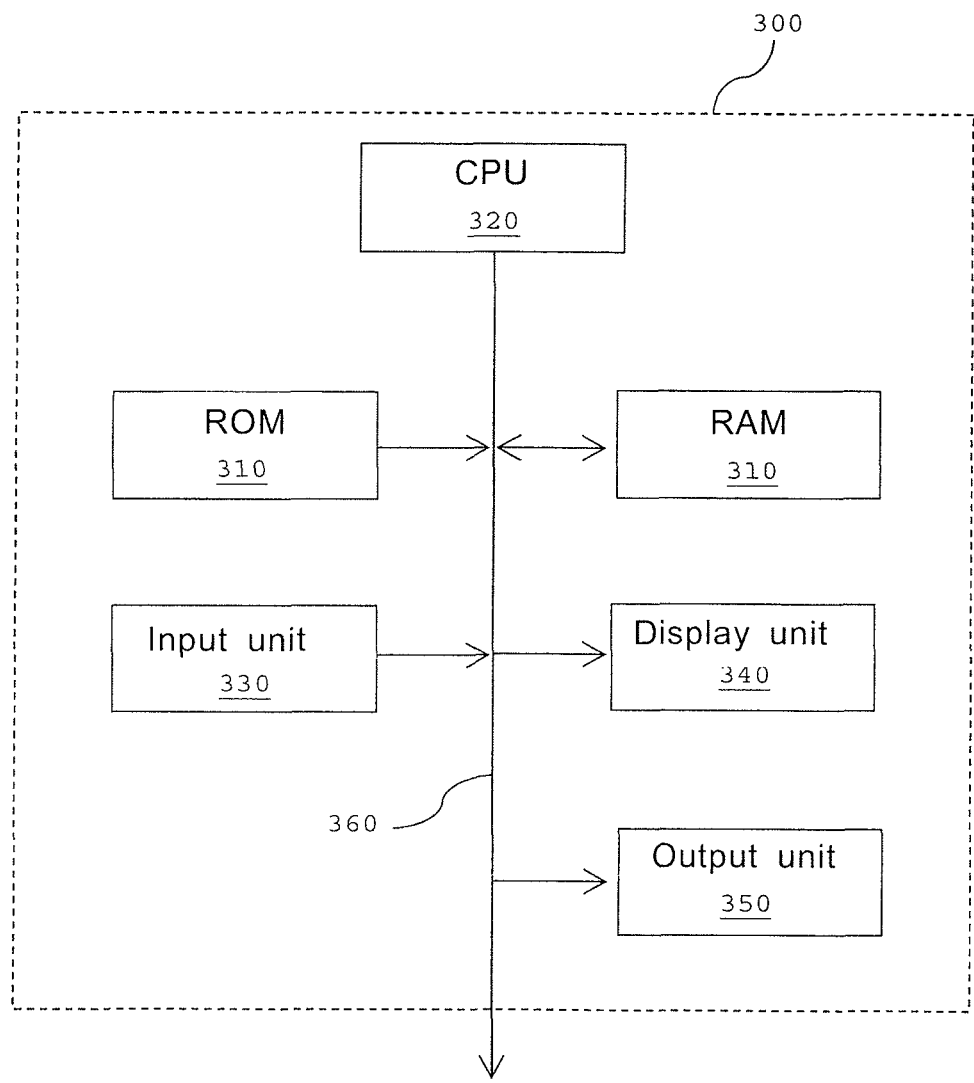
FIG. 27 is a view schematically illustrating a construction of system used in a hybrid ultraprecision machining device according to the present invention.
Figure 28:
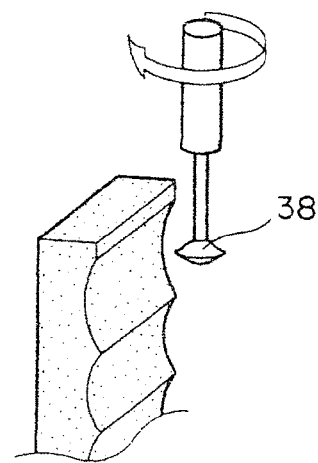
FIG. 28 is a perspective view schematically showing a grinding tool/grinding machining.
Figure 28:
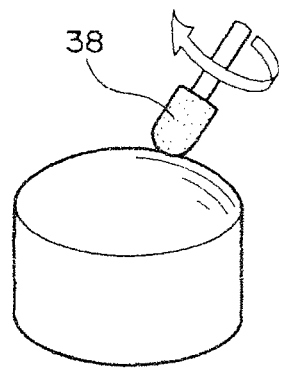
Figure 28:
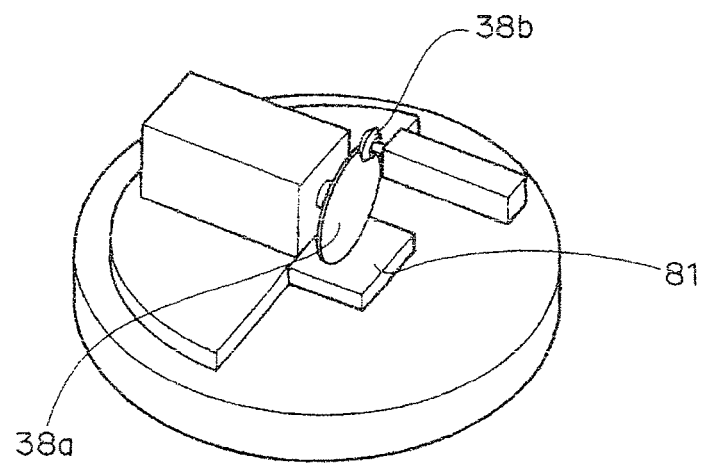

As shown in FIG. 27, the system 300, which is provided in the hybrid ultraprecision machining device of the present invention, is equipped with a memory 310 such as a primary storage and a secondary storage (e.g., ROM (Read Only Memory) and RAM (Random Access Memory)), a CPU (Central Processing Unit) 320, an input unit 330, a display unit 340, an output unit 350 and a bus 360 serving to connect them with each other. The system 300 may have a form of computer.

The input unit 330 has a pointing device (e.g., keyboard, mouse or touch panel) for an input of various instruction signals. The input signals for various instructions are transmitted to the CPU 320. The ROM serves to store various programs (i.e., programs for implementation of the hybrid ultraprecision machining) which are to be driven by the CPU 320. The RAM serves to store a readout program from the ROM in an implementable state, and also serves to temporarily store the formed program to be temporarily formed upon the program implementation. The CPU 320 serves to implement the programs of the ROM to control the system 300 as a whole. Particularly, the various programs for implementation of the hybrid ultraprecision machining, which are stored in the ROM, can be implemented by the CPU 320. Such programs may be, for example, ones used for the driving of "electromagnetic-wave-machining means", "precision-machining means" and "shape-measurement means". The display unit 340 has, for example, a LCD (Liquid Crystal Display) or CRT (Cathode Ray Tube) to display various kinds of information transmitted from the CPU 320.

According to the present invention, the memory 310 (e.g., ROM and/or RAM) of the system 300 stores the machining data for making a choice between the electromagnetic-wave-machining means and the precision-machining means on the basis of:

information on the stereoscopic model of the micro-machined product;

information on the removal volume to be removed from the volume of the workpiece in the manufacturing of the micro-machined product; and data on the removal process time of the electromagnetic-wave-machining means and data on the removal process time of the precision-machining means. For the operation of the system 300, the machining data is used by the CPU to implement the programs for the hybrid ultraprecision machining, and thereby the hybrid ultraprecision machining device 100 is suitably driven. During the driving of the device, it is controlled which of the electromagnetic-wave-machining means and the precision-machining means should be used.

In other words, the machining data for the determining method of machining according to the present invention is stored in the memory 310 of the system 300. The memory of the system stores the following data (see FIGS. 19 to 25).

The machining data for making the choice between the electromagnetic-wave-machining means and the precision-machining means on the basis of: information on the stereoscopic model of the micro-machined product; information on the removal volume to be removed from the volume of the workpiece in the manufacturing of the micro-machined product; and data on the removal process time of the electromagnetic-wave-machining means and data on the removal process time of the precision-machining means.

It should be noted that the machining data is used for the determining method of machining according to the present invention, and thus may have the following features.

The machining data is capable of making a determination of whether or not the electromagnetic-wave-machining means should be used by making use of three-dimensional CAD data on a final shape of the workpiece, on the basis of whether or not an offset face is positioned inside of an outermost plane level of the workpiece (i.e., whether or not the offset face is positioned at the interior side of the workpiece from the outermost plane thereof), the offset face being produced by displacing respective surfaces of the final shape of the workpiece by a designated amount. See FIGS. 22, 24 and 25.

The machining data is capable of making the determination of whether or not the electromagnetic-wave-machining means should be used, when the offset face is positioned at least partly inside of the outermost plane level of the workpiece, by comparing a shape of a tentative portion for electromagnetic-wave machining with a machinable shape stored in a database regarding the electromagnetic-wave-machining means, the tentative portion for electromagnetic-wave machining being defined by a region enclosed by the outermost plane level of the workpiece and a part of the offset face, the part being positioned inside of the outermost plane level. See FIGS. 23, 24 and 25.

The machining data is capable of making the determination of whether or not the electromagnetic-wave-machining means should be used by calculating a volume of the tentative portion for electromagnetic-wave machining, followed by obtaining a machining time "A" of the calculated volume based on correlation data "A" between the removal volume and the removal process time with respect to the electromagnetic-wave-machining means, and obtaining a machining time "B" of the calculated volume based on correlation data "B" between the removal volume and the removal process time with respect to the precision-machining means, followed by comparing the machining time "A" and the machining time "B" with each other. See FIGS. 21 and 25.

The machining data is capable of additionally taking an arrangement time into consideration in the comparison between the machining time "A" and the machining time "B", the arrangement time being time required for a switching from the electromagnetic-wave-machining means to the precision-machining means. See FIGS. 21 and 25.

The machining data is capable of sequentially performing the following (a) to (c):
(a) the definition of the tentative portion for electromagnetic-wave machining;
(b) the comparison between the shape of the tentative portion for electromagnetic-wave machining and the machinable shape stored in the database; and
(c) the comparison between the machining time "A" and the machining time "B". See FIG. 25.

The memory for storing "machining data" therein is stored is not limited to the ROM and/or RAM built into the computer, but a removable disk such as an optical memory disk (e.g., CD-ROM) may also be used. In this case, the removable disk can store the machining data for making the choice between the electromagnetic-wave-machining means and the precision-machining means on the basis of: information on the stereoscopic model of the micro-machined product; information on the removal volume to be removed from the volume of the workpiece in the manufacturing of the micro-machined product; and data on the removal process time of the electromagnetic-wave-machining means and data on the removal process time of the precision-machining means. The stored machining data of the removable disk can be read out to be stored in the ROM and/or RAM of the device. Alternatively, another computer of similar kind may have its own memory for storing "machining data". In other words, the ROM of the another computer used for a different purpose from that of the hybrid ultraprecision machining device may store the machining data for making the choice between the electromagnetic-wave-machining means and the precision-machining means on the basis of: the information on the stereoscopic model of the micro-machined product; information on the removal volume to be removed from the volume of the workpiece in the manufacturing of the micro-machined product; and data on the removal process time of the electromagnetic-wave-machining means and data on the removal process time of the precision-machining means. In this case, the stored machining data is transmitted from the another computer via a communication network or a removable disk to the system of the hybrid ultraprecision machining device, and then the transmitted data is stored in the ROM and/or RAM of the hybrid ultraprecision machining device.

It should be noted that the present invention as described above includes the following aspects.

The First Aspect:

A method for determining a machining device in a hybrid ultraprecision machining apparatus for manufacturing a micro-machined product from a workpiece,
the machining apparatus comprising:
 an electromagnetic-wave-machining device for roughly machining the workpiece;
 a precision-machining device for precisely machining the roughly machined workpiece; and
 a shape-measurement device for measuring a shape of the workpiece upon use of the electromagnetic-wave machining device and the precision-machining device,
wherein a choice is made between the electromagnetic-wave-machining device and the precision-machining device in the determination of the machining device, on the basis of:
information on a stereoscopic model of the micro-machined product;
information on a removal volume to be removed from a volume of the workpiece in the manufacturing of the micro-machined product; and
data on a removal process time of the electromagnetic-wave-machining device and data on a removal process time of the precision-machining device.

The Second Aspect:

The method according to the first aspect, wherein a preprocessing for the determination of the machining device is performed by making use of three-dimensional CAD data on a final shape of the workpiece, in which
an offset face is produced by displacing respective surfaces of the final shape of the workpiece by a designated amount, and
a determination of whether or not the electromagnetic-wave-machining device should be used is made on the basis of whether or not the offset face is positioned inside of an outermost plane level of the workpiece.

The Third Aspect:

The method according to the second aspect, wherein, when the offset face is positioned at least partly inside of the outermost plane level of the workpiece, a tentative portion for electromagnetic-wave machining is defined by a region enclosed by the outermost plane level of the workpiece and a part of the offset face, the part being positioned inside of the outermost plane level of the workpiece.

The Fourth Aspect:

The method according to the third aspect, wherein, a shape of the tentative portion for electromagnetic-wave machining is compared with a machinable shape stored in a database on the electromagnetic-wave-machining device to determine whether or not the electromagnetic-wave-machining device should be used.

The Fifth Aspect:

The method according to the third or fourth aspect, wherein a volume of the tentative portion for electromagnetic-wave machining is calculated to obtain a machining time "A" of the calculated volume based on correlation data "A" between the removal volume and the removal process time with respect to the electromagnetic-wave-machining device, and a machining time "B" of the calculated volume based on correlation data "B" between the removal volume and the removal process time with respect to the precision-machining device, and the machining time "A" and the machining time "B" are compared with each other to determine whether or not the electromagnetic-wave-machining device should be used.

The Sixth Aspect:

The method according to the fifth aspect, wherein an arrangement time required for a switching from the electromagnetic-wave-machining device to the precision-machining device is additionally taken into account in the comparison between the machining time "A" and the machining time "B".

The Seventh Aspect:

The method according to the fifth aspect when appendant to the fourth aspect, wherein, the followings are sequentially performed:

(a) the definition of the tentative portion for electromagnetic-wave machining;

(b) the comparison between the shape of the tentative portion for electromagnetic-wave machining and the machinable shape stored in the database; and (c) the comparison between the machining time "A" and the machining time "B".

The Eighth Aspect:

The method according to any one of the first to seventh aspects, wherein the machining apparatus further comprises a controller for controlling the electromagnetic-wave-machining device or the precision-machining device, based on information on the shape of the workpiece, the shape being measured by the shape-measuring device.

The Ninth Aspect:

The method according to any one of the first to eighth aspects, wherein the precision-machining device is equipped with a replaceable cutting tool selected from a group consisting of a planar tool, a shaper tool, a fly-cut tool, a diamond-turning tool and a micro-milling tool.

The Tenth Aspect:

The method according to any one of the first to ninth aspects, wherein the electromagnetic-wave-machining device is a laser-machining device.

The Eleventh Aspect:

The method according to any one of the first to tenth aspects, wherein a micro part of the micro-machined product has a dimension of 10 nm to 15 mm.

The Twelfth Aspect:

The method according to the eleventh aspect, wherein the micro-machined product is a metal mold for an optical lens, or an optical lens.

The Thirteenth Aspect:

A hybrid ultraprecision machining apparatus for manufacturing a micro-machined product from a workpiece, the machining apparatus comprising:

an electromagnetic-wave-machining device for roughly machining the workpiece;

a precision-machining device for precisely machining the roughly machined workpiece; and a shape-measurement device for measuring a shape of the workpiece upon use of the electromagnetic-wave machining device and the precision-machining device, the machining apparatus further comprising a system provided with a memory in which machining data for the machining apparatus is stored, the machining data is data for making a determination of a choice between the electromagnetic-wave-machining device and the precision-machining device on the basis of:

information on a stereoscopic model of the micro-machined product;

information on a removal volume to be removed from a volume of the workpiece in the manufacturing of the micro-machined product; and data on a removal process time of the electromagnetic-wave-machining device and data on a removal process time of the precision-machining device.

The Fourteenth Aspect:

The hybrid ultraprecision machining apparatus according to the thirteenth aspect, wherein the machining data is capable of making a determination of whether or not the electromagnetic-wave-machining device should be used by making use of three-dimensional CAD data on a final shape of the workpiece, on the basis of whether or not an offset face is positioned inside of an outermost plane level of the workpiece, the offset face being produced by displacing respective surfaces of the final shape of the workpiece by a designated amount.

The Fifteenth Aspect:

The hybrid ultraprecision machining apparatus according to the fourteenth aspect, wherein the machining data is capable of making the determination of whether or not the electromagnetic-wave-machining device should be used, when the offset face is positioned at least partly inside of the outermost plane level of the workpiece, by comparing a shape of a tentative portion for electromagnetic-wave machining with a machinable shape stored in a database regarding the electromagnetic-wave-machining device, the tentative portion for electromagnetic-wave machining being defined by a region enclosed by the outermost plane level of the workpiece and a part of the offset face, the part being positioned inside of the outermost plane level.

The Sixteenth Aspect:

The hybrid ultraprecision machining apparatus according to the fourteenth aspect, wherein the machining data is capable of making the determination of whether or not the electromagnetic-wave-machining device should be used by calculating a volume of the tentative portion for electromagnetic-wave machining, followed by obtaining a machining time "A" of the calculated volume based on correlation data "A" between the removal volume and the removal process time with respect to the electromagnetic-wave-machining device, and obtaining a machining time "B" of the calculated volume based on correlation data "B" between the removal volume and the removal process time with respect to the precision-machining device, followed by comparing the machining time "A" and the machining time "B" with each other.

Although a few embodiments of the present invention have been hereinbefore described, the present invention is not limited to these embodiments. It will be readily appreciated by those skilled in the art that various modifications are possible without departing from the scope of the present invention.

The present invention has been described based on such an embodiment that the precision-machining means is equipped with the replaceable cutting tool selected from the group consisting of the planar tool, the shaper tool, the fly-cut tool, the diamond-turning tool and the micro-milling tool. The present invention, however, is not necessarily limited to this embodiment. For example, the precision machining means may be equipped also with a replaceable grinding tool. That is, in addition to or instead of the above cutting tool, the grinding tool may be also replaceable in the precision machining means. The use of the grinding tool leads to an achievement of the high-precision machining. Typically, a grindstone is used as the grinding tool. The grinding of the surface of the workpiece can be performed by bringing the rotating grindstone into contact with the workpiece (see FIG. 18). Examples of abrasive grain material used for the grindstone include a diamond, a cubic crystal boron nitride (cBN), an alumina and a silicon carbide (SiC), for example. Resin bond grindstone, metal bond grindstone, or metal resin grindstone may also be used. Furthermore, the precision machining means may be equipped also with a replaceable horn for ultrasonic machining, a replaceable tool for ultrasonic vibration cutting, a replaceable grinding tool for polishing, or a replaceable micro drill.

Cutting oil for lubrication may be supplied to the tip edge of the tool in order to improve a cutting performance of the cutting tool and reduce the wear of the tool. The kind of the cutting oil is not specifically limited, and thus any suitable oils for the conventional cutting processes may be used.

As an additional remark, the present invention further provides a method for determining a machining step in a hybrid ultraprecision machining method for manufacturing a micro-machined product from a workpiece, the machining method comprising:
  (i) subjecting the workpiece to an electromagnetic-wave-machining process, and thereby roughly machining the workpiece; and
  (ii) subjecting the roughly machined workpiece to a precision-machining process,
  wherein, a shape of the workpiece is measured upon at least one of the steps (i) and (ii),
the determining method makes a determination of a choice between the step (i) of the electromagnetic-wave-machining (i.e., rough machining) and the step (ii) of the precision-machining, on the basis of:
  information on a stereoscopic model of the micro-machined product;
  information on a removal volume to be removed from a volume of the workpiece in the manufacturing of the micro-machined product; and
  "data on a removal process time of the electromagnetic-wave-machining means" and "data on a removal process time of the precision-machining means". Since the advantageous effect and the content of this method are true of those of the above inventions, the description thereof is omitted here in order to avoid the duplicated explanation.

EXAMPLES

Some confirmatory tests were conducted to confirm the effects of the hybrid ultraprecision machining device on which the determining method of the machining means according to the present invention is based.

<<Case A>>

Figure 29A:
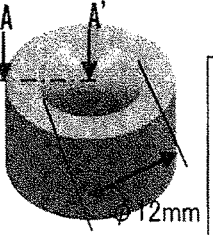

A machining method of the prior art (Comparative example 1) and a machining method of the present invention (Example 1) were performed to manufacture a metal mold for fresnel lens as shown in FIG. 29A.

Comparative Example 1

As for the machining method of the prior art, only the cutting machining was performed over the whole processes in order to produce the metal mold for fresnel lens from a difficult-to-cut material. The outline on the machining method of the prior art is shown in Table 1.

TABLE 1

| | Comparative example 1 (Method of Prior Art) | | | |
| --- | --- | --- | --- | --- |
| | Rough machining (Electric discharge machining) | Finishing allowance | Finishing (Cutting and Grinding) | Total |
| Machining time | — | → | 80 H | 80 H |
| Note (Problems) | Workpiece had its edge broken due to its micro shape, and electric discharge machining was impossible because its bottom was not able to be machined. | — | Processes from rough machining to finishing were performed. The number of dressing due to the wear of tool (i.e., grindstone) needed to be 10 or more. Final finishing was performed by cutting to ensure the edge of the workpiece bottom. Surface roughness Rz: 100 nm or less | |

As shown in the most right column of Table 1, it was found that the method of the prior art had taken "80 hours" to produce the metal mold for fresnel lens shown in FIG. 29A.

Example 1

In Example 1 of the present invention, a workpiece was roughly cut by laser machining, and thereafter the roughly cut workpiece was micro-machined to produce the metal mold for fresnel lens. The outline on Example 1 is shown in Table 2. As the shape measurement means in Example 1, the arranged position of lens was measured by a CCD camera, and the shape of the workpiece was measured by optical interferometry using a laser light. For the surface roughness measurement of the workpiece, white-light interferometry measurement (optical interference) was performed.

TABLE 2

| | Example 1 (Present Invention) | | | |
| --- | --- | --- | --- | --- |
| | Rough machining (Laser machining) | Finishing allowance | Finishing (Cutting and Grinding) | Total |
| Machining time | 16 H | → | 5 H | 21 H |
| Note (Effects) | It was possible to perform a | 5 μm to 10 μm | No rough cutting and no | |

TABLE 2-continued

Example 1 (Present Invention)

| Rough machining (Laser machining) | Finishing allowance | Finishing (Cutting and Grinding) | Total |
|---|---|---|---|
| rough machining of the shape which had been regarded as being impossible to be machined. This lead to a reduction of machining time. Surface roughness: Rz 3 to 10 μm Machined shape accuracy: <±10 μm | | semi-finishing by grinding machining were needed. It was possible to finish-machine the workpiece only by cutting machining. Surface roughness Rz: 100 nm or less | |

As shown in the most right column of Table 2, it was found that the machining method of the present invention had taken "21 hours" to produce the metal mold for fresnel lens shown in FIG. 29A.

It is concluded that, as for the production of the same metal mold for fresnel lens, the present invention can reduce the manufacturing time by about 74% as compared to that of the prior art (see Table 3).

TABLE 3

| Comparative example 1 Machining time | Example 1 Machining time | Rate of reduction in time |
|---|---|---|
| 80 H | 21 H | 74% |

<<Case B>>

Figure 29B:
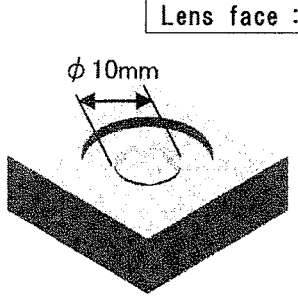

A machining method of the prior art (Comparative example 2) and a machining method of the present invention (Example 2) were performed to manufacture a metal mold for multiple lens as shown in FIG. 29B.

Comparative Example 1

As for the machining method of the prior art, the electric discharge machining was performed with respect to the workpiece, followed by the cutting machining to produce a metal mold for multiple lens from a difficult-to-cut material. The outline on the machining method of the prior art is shown in Table 4.

TABLE 4

Comparative example 2 (Method of Prior Art)

| | Rough machining (Electric discharge machining) | Finishing allowance | Finishing (Cutting and Grinding) | Total |
|---|---|---|---|---|
| Machining time | Production of electrodes: 48 H Electric discharge machining: 40 H Total: 88 H | 100 to 50 μm | 64 H | 152 H |

TABLE 4-continued

Comparative example 2 (Method of Prior Art)

| | Rough machining (Electric discharge machining) | Finishing allowance | Finishing (Cutting and Grinding) | Total |
|---|---|---|---|---|
| Note (Problems) | Workpiece was inclined for each optical axis to perform electrical discharge machining. Surface roughness: Rz 2 to 4 μm | | Positioning structure dedicated to set the metal mold was needed (in alignment with the electric discharge machining surface). Workpiece was inclined for each optical axis and subjected to grinding machining. The number of dressing due to the wear of grindstone was 32. Surface roughness: Rz 100 nm or less | |

As shown in the most right column of Table 4, it was found that the method of the prior art had taken "152 hours" to produce the metal mold for multiple lens shown in FIG. 29B.

Example 2

In Example 2 of the present invention, a workpiece was roughly cut by laser machining, and thereafter the roughly cut workpiece was micro-machined to produce the metal mold for multiple lens. The outline on Example 2 is shown in Table 5. As for Example 2, the shape of the workpiece was measured by optical interferometry using a laser light. For the surface roughness measurement of the workpiece, "white-light interferometry measurement" (optical interference) was performed.

TABLE 5

Example 2 (Present Invention)

| | Rough machining (Laser machining) | Finishing allowance | Finishing (Cutting and Grinding) | Total |
|---|---|---|---|---|
| Machining time | 20 H | → | 8 H | 28 H |
| Note (Effects) | Laser axis needed to be matched with optical axis in order to ensure machining accuracy. Machining time was able to be reduced since a finishing allowance was able to be decreased and no tool matching the shape of the workpiece was needed as compared to the case of electric discharge machining. | 5 μm to 10 μm | No metal mold setting step (aligning step) was needed since laser and cutting machinings were available in the same machine. Matching between optical axis and tool axis was able to be automatically controlled by multiaxis control to ensure the machining | |

TABLE 5-continued

| Example 2 (Present Invention) | | | |
|---|---|---|---|
| Rough machining (Laser machining) | Finishing allowance | Finishing (Cutting and Grinding) | Total |
| Surface roughness: Rz 3 to 10 μm Machined shape accuracy: ≤±10 μm | | accuracy. Surface roughness: Rz 100 nm or less | |

As shown in the most right column of Table 5, it was found that the machining method of the present invention had taken "28 hours" to produce the metal mold for multiple lens shown in FIG. 29B.

It is concluded that, as for the production of the same metal mold for multiple lens, the present invention can reduce the manufacturing time by about 82% as compared to that of the prior art (see Table 6).

TABLE 6

| Comparative example 2 Machining time | Example 2 Machining time | Rate of reduction in time |
|---|---|---|
| 152 H | 28 H | 82% |

<<Generalization>>

As can be seen from the results of the cases A and B, the present invention can reduce the manufacturing time by 70 to 80% as compared to those of the prior art wherein the microstructure is manufactured from the difficult-to-cut material. Accordingly, it is understood that the present invention can provide significantly advantageous effects for the manufacture of the micro product with the fine structure.

INDUSTRIAL APPLICABILITY

The present invention makes it possible to provide a micro-machined product from a workpiece. In particular, there can be provided a metal mold for any kinds of parts and molded products, all of which achieve the miniaturization and high functionality.

CROSS REFERENCE TO RELATED PATENT APPLICATION

The present application claims the right of priority of Japanese Patent Application No. 2011-273089 (filed on Dec. 14, 2011, the title of the invention: "METHOD FOR DETERMINING A MACHINING MEANS IN HYBRID ULTRAPRECISION MACHINING DEVICE, AND HYBRID ULTRAPRECISION MACHINING DEVICE"), the disclosure of which is incorporated herein by reference.

EXPLANATION OF REFERENCE NUMERALS

10 Electromagnetic-wave-machining means
15 Laser-machining means
15a Laser incident light
30 Precision-machining means
30a Tip of tool
31 Sliding platform
32 Motor for vertical-axis movement
33 Machining head
34 Shaper tool
35 Fly-cut tool
36 Diamond-turning tool
36a Vacuum chuck
36b Air spindle
36c Induction motor
36d Servomotor
37 Micro-milling tool
38 Grinding tool
38a Grinding tool (Diamond grindstone)
38b Truing grindstone
50 Shape-measurement means
52 Shooting means/Imaging means (Shape-measurement means)
54 Detector by laser light (Shape-measurement means)
80 Workpiece
81 Roughly machined workpiece
82 Roughly machined and subsequently precisely machined workpiece (i.e., micro-machined product)
82a Micro part of micro-machined product
85 Table for mounting workpiece
90 Computing means (e.g., computer)
100 Hybrid ultraprecision machining device
300 System for hybrid ultraprecision machining device
310 Memory
320 CPU
330 Input unit
340 Display unit
350 Output unit
360 Bus

The invention claimed is:

1. A method for determining a machining device in a hybrid ultraprecision machining apparatus for manufacturing a micro-machined product from a workpiece,
the machining apparatus comprising:
an electromagnetic-wave-machining device for roughly machining the workpiece;
a precision-machining device for precisely machining the roughly machined workpiece; and
a shape-measurement device for measuring a shape of the workpiece upon use of the electromagnetic-wave machining device and the precision-machining device,
wherein a choice is made between the electromagnetic-wave-machining device and the precision-machining device in the determination of the machining device, on the basis of:
information on a stereoscopic model of the micro-machined product;
information on a removal volume to be removed from a volume of the workpiece in the manufacturing of the micro-machined product; and
data on a removal process time of the electromagnetic-wave-machining device and data on a removal process time of the precision-machining device,
wherein a preprocessing for the determination of the machining device is performed by making use of three-dimensional CAD data on a final shape of the workpiece, in which
an offset face is produced by displacing respective surfaces of the final shape by a designated amount, and
a determination of whether or not the electromagnetic-wave-machining device should be used is made on the basis of whether or not the offset face is positioned inside of an outermost plane level of the workpiece.

2. The method according to claim 1, wherein, when the offset face is positioned at least partly inside of the outermost plane level of the workpiece, a tentative portion for electromagnetic-wave machining is defined by a region enclosed by the outermost plane level and a part of the offset face, the part being positioned inside of the outermost plane level of the workpiece.

3. The method according to claim 2, wherein, a shape of the tentative portion for electromagnetic-wave machining is compared with a machinable shape stored in a database on the electromagnetic-wave-machining device to determine whether or not the electromagnetic-wave-machining device should be used.

4. The method according to claim 3, wherein a volume of the tentative portion for electromagnetic-wave machining is calculated to obtain a first machining time of the calculated volume based on first correlation data between the removal volume and the removal process time with respect to the electromagnetic-wave-machining device, and a second machining time of the calculated volume based on second correlation data between the removal volume and the removal process time with respect to the precision-machining device, and
the first machining time and the second machining time are compared with each other to determine whether or not the electromagnetic-wave-machining device should be used.

5. The method according to claim 4, wherein an arrangement time required for a switching from the electromagnetic-wave-machining device to the precision-machining device is additionally taken into account in the comparison between the first machining time and the second machining time.

6. The method according to claim 4, wherein, the followings are sequentially performed:
(a) the definition of the tentative portion for electromagnetic-wave machining;
(b) the comparison between the shape of the tentative portion for electromagnetic-wave machining and the machinable shape stored in the database; and
(c) the comparison between the first machining time and the second machining time.

7. The method according to claim 1, wherein the machining apparatus further comprises a controller for controlling the electromagnetic-wave-machining device or the precision-machining device, based on information on the shape of the workpiece, the shape being measured by the shape-measuring device.

8. The method according to claim 1, wherein the precision-machining device is equipped with a replaceable cutting tool selected from a group consisting of a planar tool, a shaper tool, a fly-cut tool, a diamond-turning tool and a micro-milling tool.

9. The method according to claim 1, wherein the electromagnetic-wave-machining device is a laser-machining device.

10. The method according to claim 1, wherein a micro part of the micro-machined product has a dimension of 10 nm to 15 mm.

11. The method according to claim 10, wherein the micro-machined product is a metal mold for an optical lens, or an optical lens.

12. A hybrid ultraprecision machining apparatus for manufacturing a micro-machined product from a workpiece, the machining apparatus comprising:
a first machining tool configured to roughly machine the workpiece;
a second machining tool configured to precisely machine the roughly machined workpiece; and
a measurement tool configured to measure a shape of the workpiece upon use of the first machining tool and the second machining tool,
the machining apparatus further comprising a system provided with a memory in which machining data for the machining apparatus is stored,
the machining data is data for making a choice between the first machining tool and the second machining tool based on:
information on a stereoscopic model of the micro-machined product;
information on a removal volume to be removed from a volume of the workpiece in the manufacturing of the micro-machined product; and
data on a removal process time of the first machining tool and data on a removal process time of the second machining tool, and
wherein the machining data is capable of making a determination of whether or not the first machining tool should be used by making use of three-dimensional CAD data on a final shape of the workpiece, based on whether or not an offset face is positioned inside of an outermost plane level of the workpiece, the offset face being produced by displacing respective surfaces of the final shape of the workpiece by a designated amount.

13. The hybrid ultraprecision machining apparatus according to claim 12, wherein the machining data is capable of making the determination of whether or not the first machining tool should be used, when the offset face is positioned at least partly inside of the outermost plane level of the workpiece, by comparing a shape of a tentative portion for performing rough machining with a machinable shape stored in a database regarding the first machining tool, the tentative portion for performing rough machining being defined by a region enclosed by the outermost plane level of the workpiece and a part of the offset face, the part being positioned inside of the outermost plane level.

14. The hybrid ultraprecision machining apparatus according to claim 12, wherein the machining data is capable of making the determination of whether or not the first machining tool should be used by calculating a volume of the tentative portion for electromagnetic-wave machining, followed by obtaining a first machining time of the calculated volume based on first correlation data between the removal volume and the removal process time with respect to the first machining tool, and obtaining a second machining time of the calculated volume based on second correlation data between the removal volume and the removal process time with respect to the second machining tool, followed by comparing the first machining time and the second machining time with each other.

* * * * *